(12) United States Patent
Kannan

(10) Patent No.: US 12,367,021 B1
(45) Date of Patent: Jul. 22, 2025

(54) FAST INTERFERENCE GRAPH CONSTRUCTION FOR A BINARY TREE OF INTERVAL NODES

(71) Applicant: Amazon Technologies, Inc., Seattle, WA (US)

(72) Inventor: Parivallal Kannan, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 18/194,557

(22) Filed: Mar. 31, 2023

(51) Int. Cl.
*G06F 8/41* (2018.01)

(52) U.S. Cl.
CPC .............. *G06F 8/433* (2013.01); *G06F 8/445* (2013.01)

(58) Field of Classification Search
None
See application file for complete search history.

(56) References Cited

U.S. PATENT DOCUMENTS

| | | | | |
|---|---|---|---|---|
| 6,374,403 B1* | 4/2002 | Darte | ................. | G06F 8/45 717/161 |
| 6,631,513 B1* | 10/2003 | Gil | .................... | G06F 9/4492 717/116 |
| 6,754,887 B1* | 6/2004 | Gil | .................... | G06F 9/4492 717/133 |
| 11,467,835 B1* | 10/2022 | Sengupta | ............ | G06F 9/3877 |
| 2005/0050531 A1* | 3/2005 | Lee | ................... | G06F 11/3428 714/E11.194 |
| 2011/0055819 A1* | 3/2011 | Doyle | ................. | G06F 8/4442 717/156 |
| 2017/0322877 A1* | 11/2017 | Chan | .................. | G06F 9/5027 |
| 2021/0125042 A1* | 4/2021 | Han | .................... | G06N 3/063 |
| 2022/0374288 A1* | 11/2022 | Kibardin | ............. | G06N 3/084 |

* cited by examiner

*Primary Examiner* — Qing Chen
(74) *Attorney, Agent, or Firm* — Weaver Austin Villeneuve & Sampson LLP

(57) ABSTRACT

Techniques for reducing interference graph generation time may include obtaining a data flow graph representing a computational flow. For each memory object in the data flow graph, a memory object live interval can be added to a vector of intervals. The memory object live interval indicates a last-use of the memory object and a first-definition of the memory object. The vector of intervals can be converted into a binary tree of interval nodes. For each interval node in the binary tree, an earliest-first-definition value is determined for the sub-tree rooted at the interval node, and is associated with the interval node. The binary tree can be queried for interferences of a memory object, and memory allocation can be performed for the computational flow based on the interferences.

20 Claims, 15 Drawing Sheets

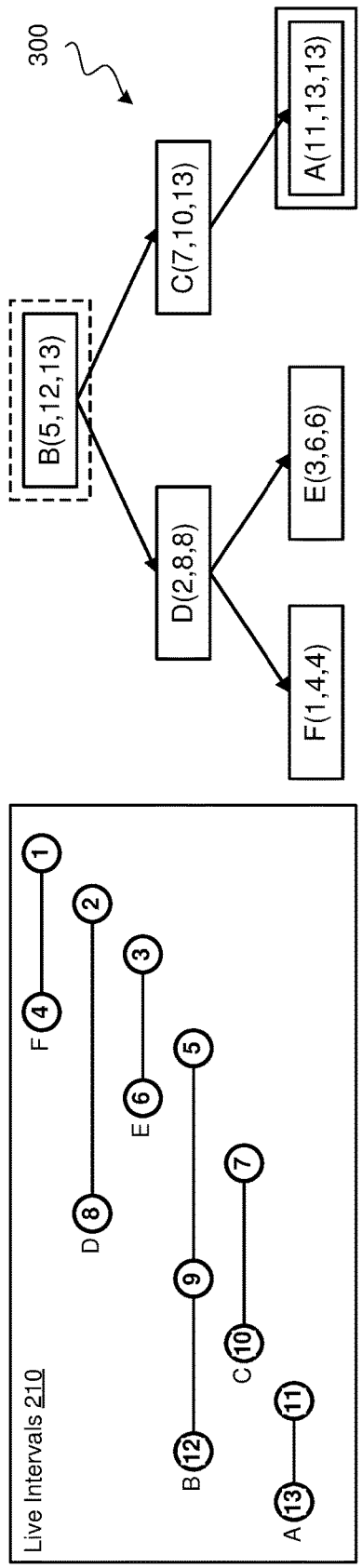

(s1) if (QueryNode.low > node.max) return;
(s2) recurse on node.left;
(s3) if (QueryNode overlaps with node)
     add node to inteference list;
(s4) if (QueryNode.high < node.low) return;
(s5) recurse node.right;

QueryNode = A; Interference of A = {B}

(B-s1)  (A.low > B.max ?) = false ->
(B-s2)  recurse on B.left = D.subtree
        (D-s1)  (A(low) > D(max) ?) = true -> return
(B-s3)  (A overlap with B ?) = true ->
        add B to interference list
(B-s4)  (A.high < B.low ?) = false ->
(B-s5)  recurse on B.right

FIG. 4D

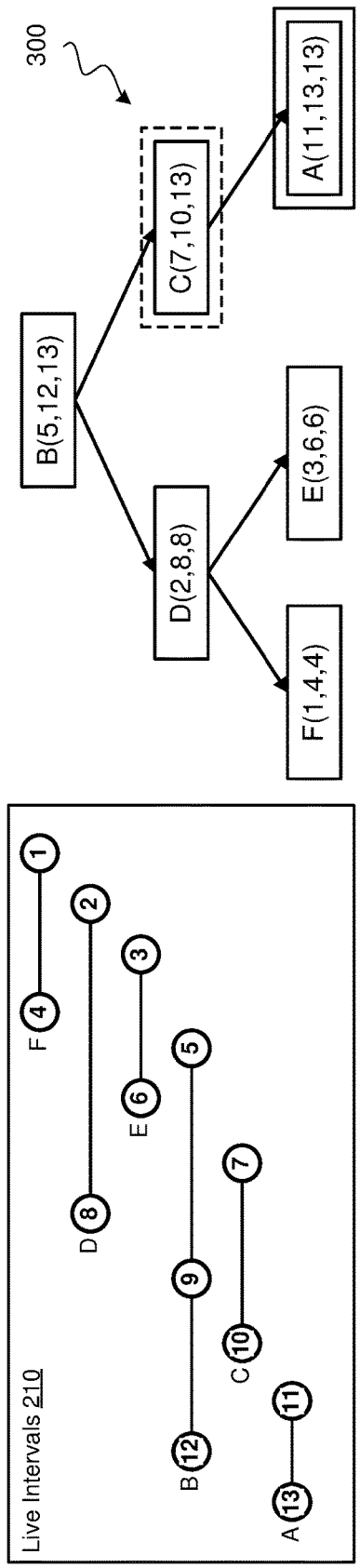

FIG. 4E (s1) if (QueryNode.low > node.max) return;
(s2) recurse on node.left;
(s3) if (QueryNode overlaps with node)
     add node to inteference list;
(s4) if (QueryNode.high < node.low) return;
(s5) recurse node.right;

QueryNode = A; Interference of A = {B}

(B-s1) (A.low > B.max ?) = false ->
(B-s2) recurse on B.left = D.subtree
       (D-s1) (A(low) > D(max) ?) = true -> return
(B-s3) (A overlap with B ?) = true ->
       add B to interference list
(B-s4) (A.high < B.low ?) = false ->
(B-s5) recurse on B.right = C.subtree
       (C-s1) (A(low) > C(max) ?) = false ->
       (C-s2) recurse on C.left = null
       (C-s3) (A overlap with C ?) = false
       (C-s4) (A.high < C.low ?) = true -> return

FAST INTERFERENCE GRAPH CONSTRUCTION FOR A BINARY TREE OF INTERVAL NODES

BACKGROUND

Machine learning utilizes neural network models to perform complex tasks such as image recognition, natural language processing, among others. A neural network can be represented using a data flow graph that includes different types of operations to be performed on an input data set. The operations may include computations, data reshaping operations, memory accesses, and/or other operations. A compiler can generate machine level instructions based on the data flow graph, which can be executed by a computing device to generate output data based on the input data set.

BRIEF DESCRIPTION OF THE DRAWINGS

Various embodiments in accordance with the present disclosure will be described with reference to the drawings, in which:

FIG. 4D shows an example of a fourth part of querying a binary tree for interferences;

FIG. 4E shows an example of a fifth part of querying a binary tree for interferences;

DETAILED DESCRIPTION

Figure 1:
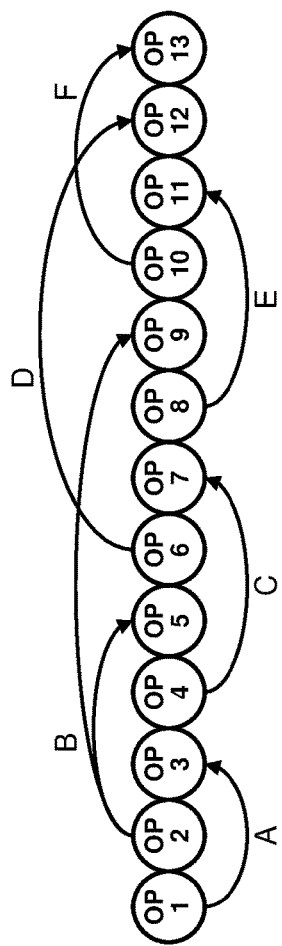
FIG. 1 shows an example of a data flow graph for a neural network model.

The application of machine learning to ever more complex tasks has led to neural network models expanding in both complexity and size. As a result, the buffer memory capacity of most accelerators is typically not sufficient to fit the entire model data and activations that are generated during runtime. During the compilation of a neural network model, a memory allocator can be invoked to assign memory locations in the accelerator's buffer memory. The memory locations are used to store tensors representing the model data and activations utilized during execution of the neural network model. At certain points during runtime execution, the buffer memory may not be able to accommodate all the tensors that are live at the same time. A tensor is considered live from the instruction that generated the tensor (referred to as the first-definition of the tensor), until the last instruction that uses the tensor (referred to as the last-use of the tensor). The time from the first-definition to the last-use of the tensor can be referred to as the live interval of the tensor. Some tensors can have multiple uses during the live interval of the tensor.

When the buffer memory is unable to store all of the tensors that are live at the same time, the memory allocator can identify some tensors to spill to host memory. The spilled tensors can be reloaded into the buffer memory at a later point in time when they are needed. To determine which tensors are live at the same time, the memory allocator can generate an interference graph. The interference graph contains vertices and edges connecting the vertices. The vertices represent tensors utilized in the neural network model, and the edges connecting the vertices indicate tensors having live intervals that overlap with each other. With the large number of tensors being utilized in complex neural network models, the memory allocation process can take up a significant amount of the compilation time. In some instances, a large portion of the time spent by the memory allocator can be on the generation of the interference graph.

One way to generate the interference graph is to use a triangular bitmap data structure. The triangular bitmap is a two-dimensional data structure. The rows of the triangular bitmap include a row for each tensor used in the neural network model. The columns of the triangular bitmap include a column for each tensor used in the neural network model. Each bit cell in the triangular bitmap can have a value of '1' when the row tensor and the column tensor of the bit cell have overlapping live intervals, and a value of '0' when the pair of tensors do not interfere with each other. The triangular bitmap can be populated by sequentially checking the live interval of a tensor with every other tensor to determine which tensor pair has overlapping live intervals. However, generation of the triangular bitmap can have a time complexity of $O(N^2)$, which may not scale well with the large number of tensors used in complex neural network models.

To reduce the interference graph generation time, the techniques disclosed herein generate a binary tree of interval nodes to represent the live intervals of memory objects utilized in a computational flow. The memory objects can be, for example, tensors utilized in a neural network model. Interferences of the memory objects can be determined by querying the binary tree similar to a binary search. Generation of the binary tree can have a time complexity of $O(N)$, and querying the binary tree can have a time complexity of $O(\log N+k)$. By utilizing the techniques disclosed herein to generate the interference graph, significant reduction in the compilation time can be achieved, especially for interference graphs of computational flows having a large number of memory objects such as tensors used in complex neural network models.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

A neural network model can be described using a high-level programming language, such as Java, C++, R, Go, Python, or Tensorflow, etc. The neural network model can be processed by a compiler to generate machine level instructions that can be executed by an accelerator such as a neural network processor to generate output data based on an input dataset. The input dataset, the output data, and any intermediate data generated by the neural network model can be represented using tensors. The input dataset may correspond to an image, a text, an audio, or a video that needs to be operated on. The compiler can process the neural network model over multiple stages, which may include generating an intermediate representation (IR) of the neural network model based on the programming code of the model, performing hardware agnostic optimizations on the IR to generate a modified IR, performing hardware-specific optimizations on the modified IR for the given hardware architecture, and generating the machine level instructions for the given hardware architecture.

In some implementations, the intermediate representation (e.g., in the form of IR instructions) of the neural network model can represent a data flow graph. The data flow graph may include nodes and edges connecting the nodes. The nodes may represent operators such as computations, data rearrangements, and/or other operations; and the edges or connections between the nodes of the data flow graph may represent dependencies between the nodes, such as data dependencies. Some of the operators in the data flow graph can be computational operators such as element-wise unary operators (e.g., datatype casting, inversion, bit-shift, etc.), element-wise binary operators (e.g., logical operations such as AND, OR, XOR, etc.; algebraic operations such as addition, subtraction, etc.), matrix multiplication, convolution, batch normalization operators, collective compute operators (e.g., all-reduce, all-gather, etc.), or other computational neural network operators. Some of the operators in the data flow graph can be data rearrangement operators such as broadcast, reshape, transpose, split, concatenate, etc.

FIG. 1 illustrates an example of a data flow graph 100 representing a neural network model. The data flow graph can be an intermediate representation (e.g., in the form of IR instructions) of the neural network model generated from the source code of the neural network model in the frontend processing of the compiler, and may have undergone various optimizations steps in the middle-end processing of the compiler. At the stage of the compilation process shown in FIG. 1, the loop nests in the code may have been unrolled, and thus the instructions in the IR have been flattened and can be represented as a straight-line sequence.

Each node in data flow graph 100 (e.g., Op1, Op2, etc.) may represent an operator in the sequence of execution, such as any of the operators described above. The operators in data flow graph 100 are arranged in the order of execution. Hence, the operator of node Op2 is executed after the operator of node Op1, and the operator of Op3 is execute after the operator of Op2, and so on. Edges (or arrows) connecting the nodes indicate a data dependence of a subsequent operation to an earlier operation. For example, the edge connecting node Op5 from node Op2 may indicate that the operator in node Op5 uses a tensor generated by the operator of node Op2. Some tensors can be used multiple times. For example, in addition to being used by the operator of node Op5, the tensor generated by the operator of node Op2 is also used by the operator of node Op9.

In data flow graph 100, the alphabet letters represent tensors that are generated by one operator and used by another operator. Hence, tensor A is generated by the operator of node Op1, and is used by the operator of node Op3. Tensor B is generated by the operator of node Op2, and is used by the operator of node Op5 and the operator of node Op9. Tensor C is generated by the operator of node Op4, and is used by the operator of node Op7. Tensor D is generated by the operator of node Op6, and is used by the operator of node Op12. Tensor E is generated by the operator of node Op8, and is used by the operator of node Op11. Tensor F is generated by the operator of node Op10, and is used by the operator of node Op13.

It should be understood that the data flow graph 100 shown in FIG. 1 is just a simple example of a data flow graph for ease of explanation, and that data flow graphs in other implementations can be much larger, and may include thousands or even millions of operators and data dependencies.

Figure 2:
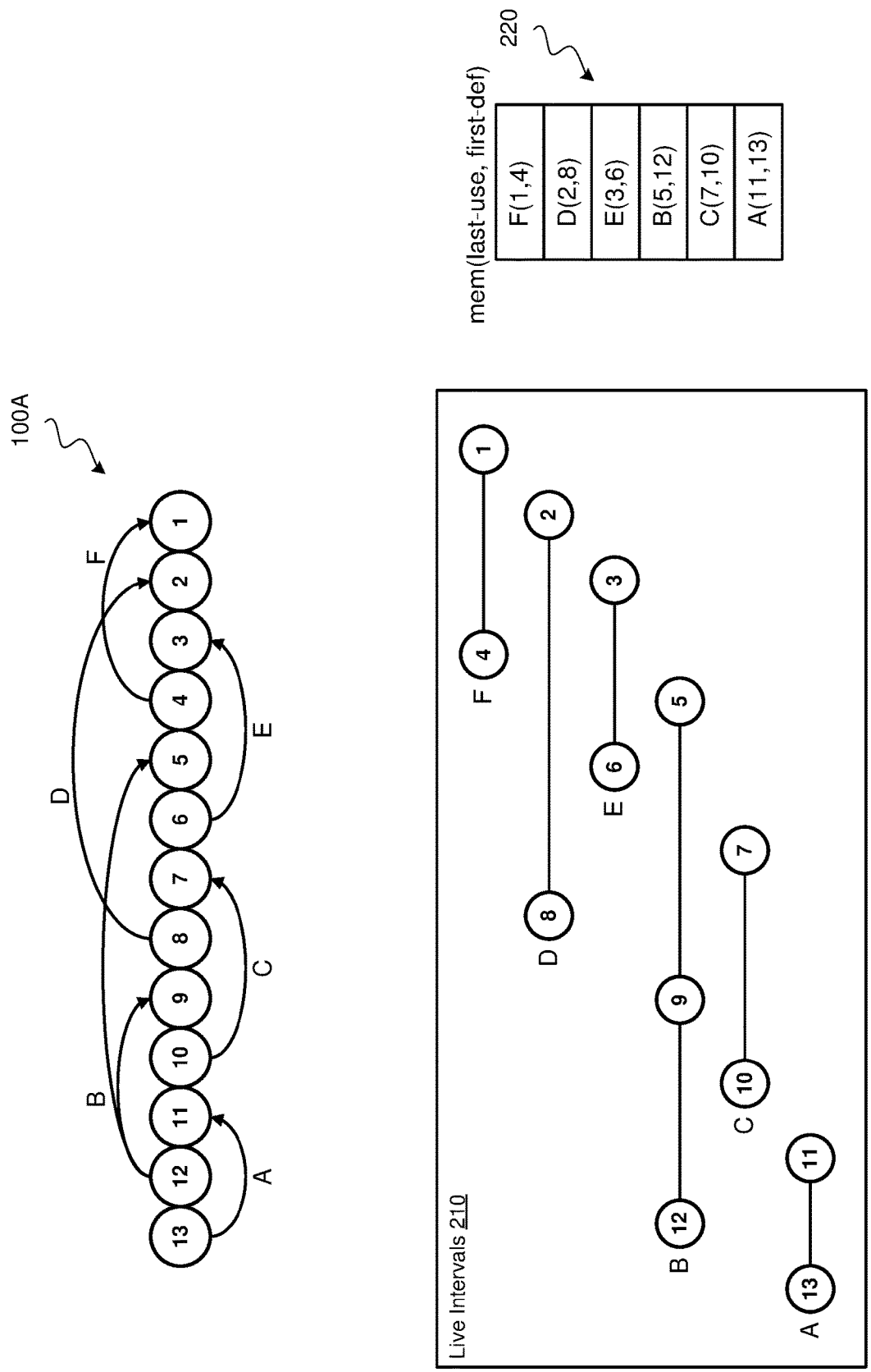
FIG. 2 shows an example of generating a vector of intervals from a data flow graph.

FIG. 2 illustrates an example of generating a vector of intervals from a data flow graph. In the example shown, a vector of intervals 220 is generated from the data flow graph 100 of FIG. 1. For ease of reference, data flow graph 100 from FIG. 1 is reproduced in FIG. 2 as data flow graph 100A. The nodes of data flow graph 100A have been assigned a value that increments from the end of the data flow graph 100A towards the beginning of the data flow graph 100A, as will be explained further below.

To generate the vector of intervals 220, data flow graph 100A can be traversed backwards in reverse order from the output of data flow graph 100A towards the input of the data flow graph 100A. For each tensor encountered when traversing data flow graph 100A backwards, a tensor live interval can be added to the vector of intervals in the order in which the tensors are encountered. When traversing backwards, the initial encounter of the tensor is the last-use of the tensor, and the last encounter of the tensor is the first-definition of the tensor. Referring to FIG. 2, the operators can be assigned a value that increments towards the beginning of the data flow graph 100A. Hence, node Op13 of data flow graph 100 of FIG. 1 can be assigned a value of 1, and Op1 can be assigned a value of 13. The nodes will be referred to using their assigned value shown in FIG. 2. The live interval of a tensor can be represented using a 2-tuple that includes the assigned value of the node corresponding to the last-use of the tensor and the assigned value of the node corresponding to the first-definition of the tensor.

The first tensor encountered when traversing backwards in data flow graph 100A is Tensor F, which has a tensor live interval of (1, 4) representing the last-use at node 1 and the first-definition at node 4. The second tensor encountered is Tensor D, which has a tensor live interval of (2, 8). The third tensor encountered is Tensor E, which has a tensor live interval of (3, 6). The fourth tensor encountered is Tensor B, which has a tensor live interval of (5, 12). The fifth tensor encountered is Tensor C, which has a tensor live interval of (7, 10). The sixth tensor encountered is Tensor A, which has a tensor live interval of (11, 13). The live intervals of the tensors, as decomposed from the data flow graph 100A, are shown as live intervals 210.

When the tensor live intervals are added to the vector of intervals 220 in the order in which they are encountered when traversing backwards on data flow graph 100A, the tensor live intervals are pre-sorted in the order of last-use. Hence, the tensor live intervals 210 appear in the vector of intervals 220 in the order of F(1, 4), D(2, 8), E(3, 6), B(5, 12), C(7, 10) and A(11, 13). By traversing data flow graph 100A backwards, the vector of intervals 220 is naturally sorted in this way to aid the generation of the subsequent binary tree. It is also possible to traverse data flow graph 100A in a different manner to obtain the live intervals 210. However, doing so may incur an additional sorting step to sort the live intervals 210 into the order of last-use.

Figure 3:
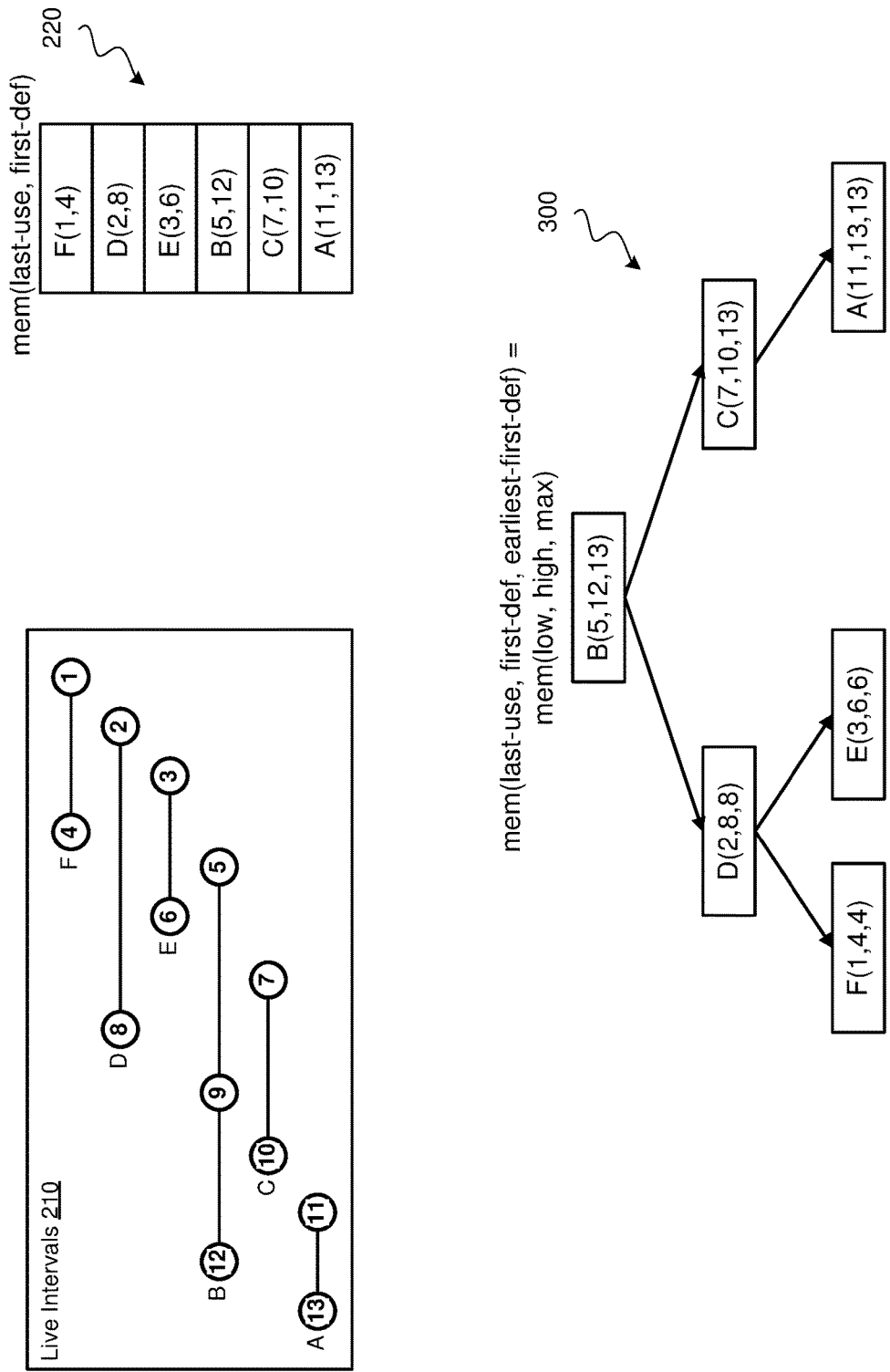
FIG. 3 shows an example of generating a binary tree from a vector of intervals.

FIG. 3 illustrates an example of generating a binary tree from a vector of intervals. The live intervals 210 and the vector of intervals 220 from FIG. 2 are reproduced in FIG. 3. To convert the vector of intervals 220 into a binary tree 300, the median of the vector of intervals (e.g., the tensor live interval in the middle of the order) is used as the root of the binary tree 300. Referring to the vector of intervals 220, the median of the vector of intervals 220 is tensor B with a live interval of (5, 12). Hence, the tensor live interval B(5, 12) is used as the root node of binary tree 300.

The remaining nodes of the binary tree can be generated by taking the medians of the segments before tensor live interval B(5, 12) and after tensor live interval B(5, 12), and using these medians as the root of the left sub-tree and the root of the right sub-tree, respectively. The process continues until all tensor live intervals from the vector of intervals 220 have been added as nodes to binary tree 300. The nodes of binary tree 300 can be referred to as interval nodes. In this manner, binary tree 300 is generated as a balanced binary tree with B(5, 12) as the root node. Root node B(5, 12) has a left node of D(2, 8) and a right node of C(7, 10). The subtree rooted at D(2, 8) has a left node of F(1, 4) and a right node of E(3, 6). The subtree rooted at C(7, 10) does not have a left node, but has a right node of A(11, 13).

Upon converting the vector of intervals 220 into the binary tree 300, the 2-tuple of each interval node is augmented into a 3-tuple by including a value representing the earliest-first-definition of the tensors in the subtree rooted at the interval node. For example, referring to interval node A(11,13), there are no left and right nodes branching from node A(11,13). Thus, the earliest-first-definition of the tensors in the subtree rooted at interval node A(11,13) is the first-definition of node A(11,13), and interval node A(11,13) is augmented as interval node A(11,13,13). Referring to interval node C(7,10), the earliest-first-definition of the tensors in the subtree rooted at interval node C(7,10) is the first-definition of node A(11,13). Hence, interval node C(7, 10) can be augmented as interval node C(7,10,13). The remaining interval nodes in binary tree 300 can be augmented in a similar manner to include the earliest-first-definition of tensors in the subtree rooted at the corresponding interval node.

The resulting 3-tuple of each interval node in binary tree 300 includes the last-use of the corresponding tensor, the first-definition of the corresponding tensor, and the earliest-first-definition of the tensors in the subtree rooted at the corresponding interval node. Because the operators of the data flow graph have been assigned values that increment towards the beginning of the data flow graph, the 3-tuple of {last-use, first-definition, earliest-first-definition} can also be expressed as {low, high, max}. The "low" value of the interval node represents the last-use of the corresponding tensor, the "high" value of the interval node represents the first-definition of the corresponding tensor, and the "max" value of the interval node represents the earliest-first-definition of the tensors in the subtree rooted at the interval node, which is the maximum of all tuple values in the subtree rooted at the interval node.

Given the binary tree of interval nodes, the interferences of each tensor can be determined by querying the binary tree for the tensor of interest. The interval node corresponding to the tensor for which the interferences are being queried for can be referred to as the query node. Interferences for the query node can be determined by recursively querying the binary tree starting at the root of the binary tree. Querying the binary tree for interference can be similar to performing a binary search.

An example of the pseudocode for obtaining the interferences of a tensor (referred to as "query Node") can be as follows:

```
getInterferences(queryNode, node=rootNode, result) {
    if (queryNode.low > node.max) return;              // s1 - no match in sub-tree under node
    getInterferences(queryNode, node.left, result);    // s2 - recurse to the left
    if (queryNode.overlaps(node)) result.push(node);   // s3 - add node to interference list
    if (queryNode.high < node.low) return;             // s4 - no match to the right of node
    getInterferences(queryNode, node.right, result);   // s5 - recurse to the right
}
```

The pseudocode starts with the query at the top root of the binary tree as the initial interval node to check. The first statement s1 compares the last-use of the tensor (queryNode.low) with the earliest-first-definition value of the interval node (node.max). If the last-use of the tensor is before the earliest-first-definition value of the interval node (queryNode.low>node.max), then the tensor does not have an interference with any tensor in a sub-tree rooted at the interval node. The query can be returned. Otherwise, execution continues to the next statement s2.

The second statement s2 queries the left sub-tree of the interval node, which will execute the pseudocode by setting the left node of the interval node as the new root node. In other words, the query will recurse on the left sub-tree of the interval node to check the nodes on the left sub-tree.

The third statement s3 determines if the interval node has a live interval that overlaps with the tensor. The interval node overlaps with the tensor if the first-definition of the tensor is between the first-definition and the last-use of the interval node, or if the last-use of the tensor is between the first-definition and the last-use of the interval node. If the interval node overlaps with the tensor, the interval node is added to the interference list of the tensor.

The fourth statement s4 compares the first-definition of the tensor (queryNode.high) with the last-use of the interval node (node.low). If the first-definition of the tensor is after the last-use of the interval node (queryNode.high<node.low), then the tensor does not have an interference with any tensor in a right sub-tree of the interval node. The query can be returned.

Otherwise, execution continues to the next statement s5.

The fifth statement s5 queries the right sub-tree of the interval node, which will execute the pseudocode by setting the right node of the interval node as the new root node. In other words, the query will recurse on the right sub-tree of the interval node to check the nodes on the right sub-tree. The query process for a tensor will complete when all recursive levels have been returned. The query process for each tensor can also be executed in parallel to reduce the compiler runtime to obtain the interferences of the tensors in the data flow graph.

FIGS. 4A-4E illustrate an example of querying a binary tree to obtain the interferences of a query node. For ease of reference, live intervals 210 and binary tree 300 from FIG.

3 are reproduced in FIGS. 4A-4E. The pseudocode for obtaining the interferences is also shown in FIGS. 4A-4E. To provide tracing of the pseudocode, the five statements in the pseudocode have been labeled s1 to s5. Because the pseudocode is recursive in nature, the pseudocode tracing of each step is prepended with a root node reference to indicate which recursive level the statement is being executed from. In the binary tree 300 of FIGS. 4A-4E, the query node (the tensor for which the interferences are being sought) is shown with an outer rectangle, and the root node of the recursive level is shown with an outer dotted rectangle.

Figure 4A:
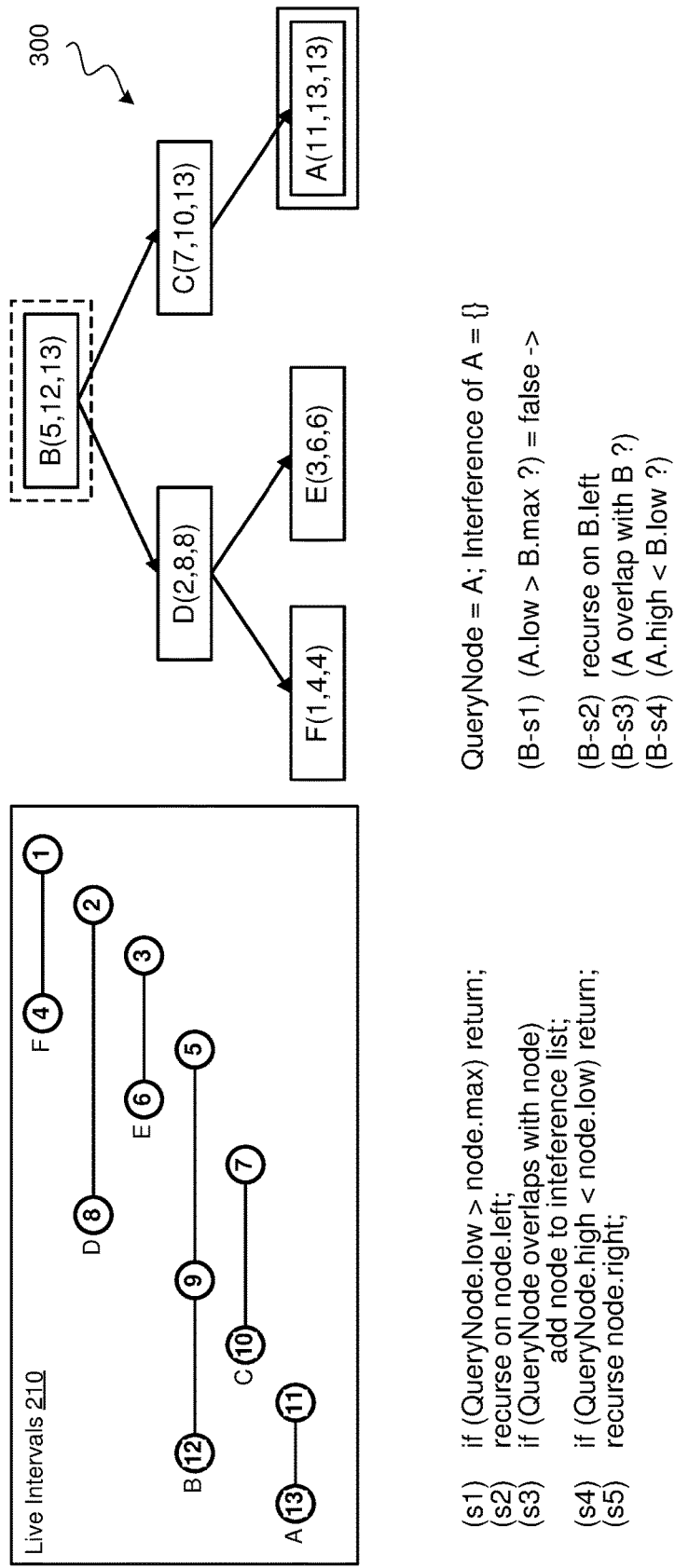
FIG. 4A shows an example of a first part of querying a binary tree for interferences.

Referring to the example shown in FIG. 4A, the binary tree 300 is queried to obtain the interferences for tensor A. The query node is set to "A" with an initial interference list containing null elements. The query starts with the top root node of binary tree 300 as the interval node to check, which is node B(5,12,13). The statements executed under this recursive level are labeled B-sx to indicate the statements are executed for the tree level rooted at node B(5,12,13). The first statement B-s1 checks if the "low" of query node A(11,13,13) is greater than the "max" of node B(5,12,13). This is false, so the next statements B-s2 to B-s4 are executed.

Figure 4B:
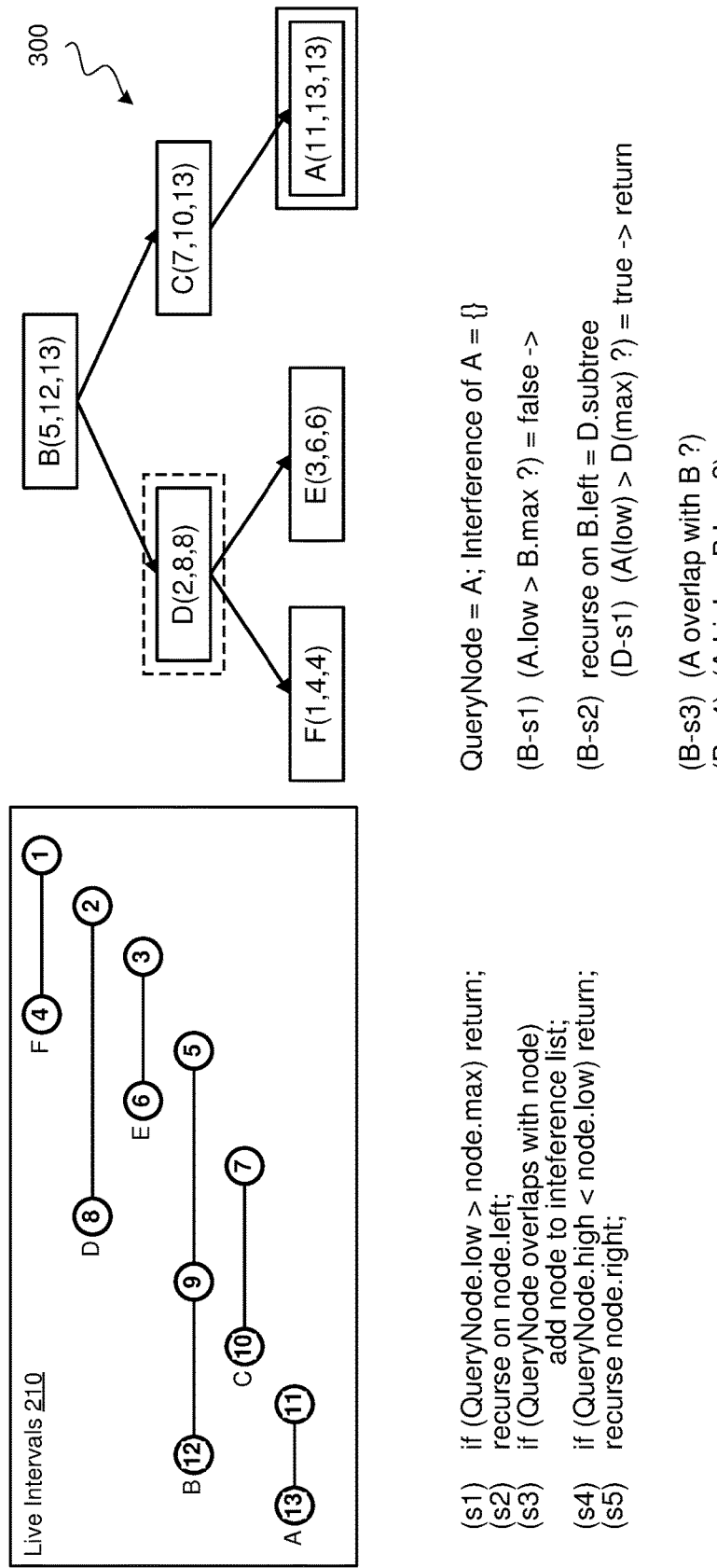
FIG. 4B shows an example of a second part of querying a binary tree for interferences.

Referring now to FIG. 4B, the statement B-s2 recurses the query on the left subtree of node B(5,12,13). Hence, the left node of node B(5,1213), which is node D(2,8,8), becomes the root node of this recursive level, and statements executed under this recursive level are labeled D-sx. The first statement D-s1 at this level checks if the "low" of query node A(11, 13,13) is greater than the "max" of node D(2,8,8). This is true, so the query at this recursive level can be returned.

Figure 4C:
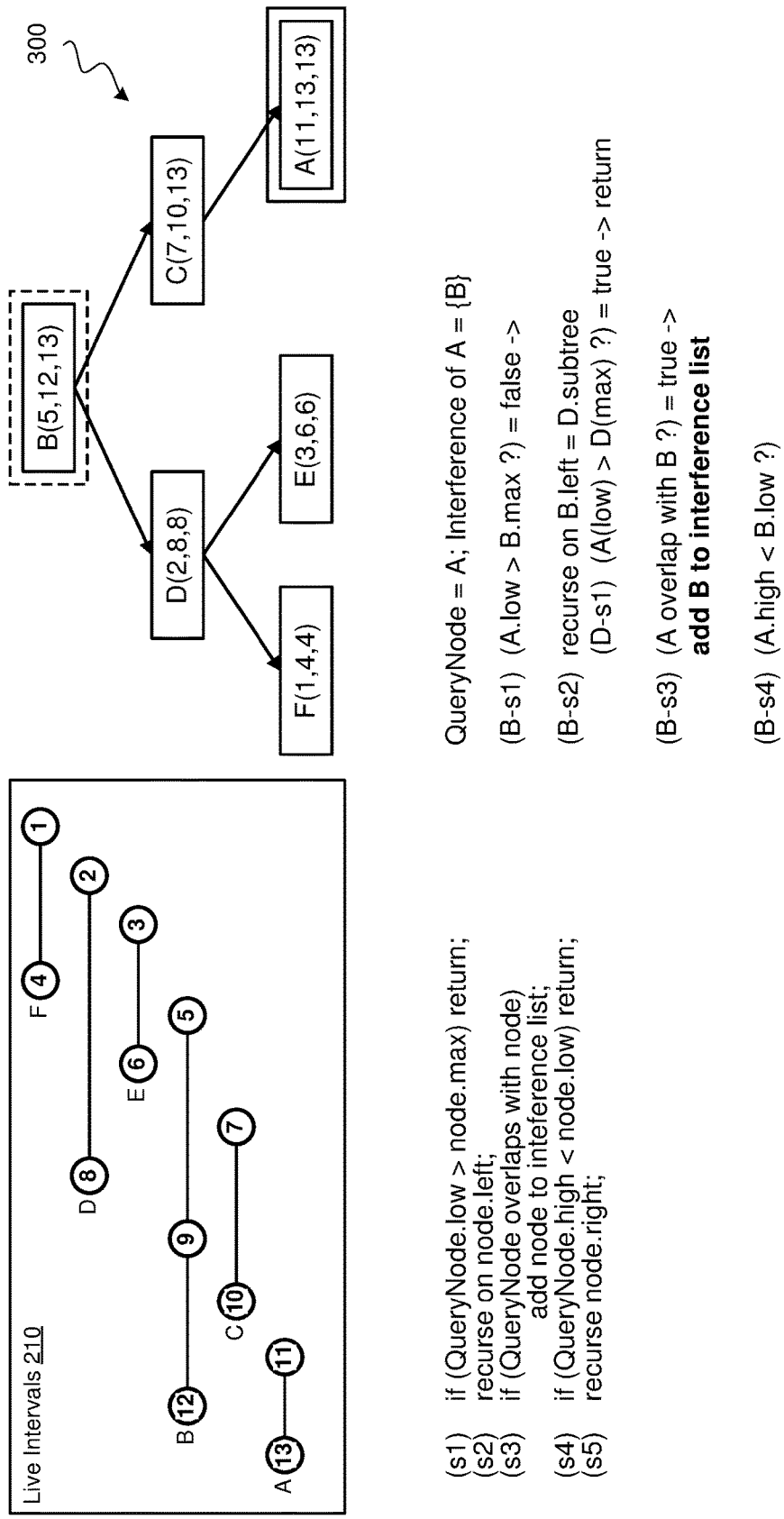
FIG. 4C shows an example of a third part of querying a binary tree for interferences.

Referring now to FIG. 4C, the next statement back at the recursive level rooted at node B(5,12,13) is statement B-s3, which checks if the live interval of query node A(11,13,13) overlaps with node B(5, 12, 13). Since the "low" of query node A(11,13, 13) is between the "low" and "high" of node B(5,12,13), query node A(11,13,13) overlaps with node B(5,12,13), and tensor B is added to the interference list of tensor A.

Referring now to FIG. 4D, the next statement at the recursive level rooted at node B(5,12,13) is statement B-s4, which checks if the "high" of query node A(11,13,13) is less than the "low" of node B(5,12,13). This is false, so the next statements B-s5 is executed.

Referring now to FIG. 4E, the statement B-s5 recurses the query on the right subtree of the node B(5,12, 13). Hence, the right node of node B(5,12,13), which is node C(7,10,13), becomes the root node of this recursive level, and statements executed under this recursive level are labeled C-sx. The first statement C-s1 at this level checks if the "low" of query node A(11,13,13) is greater than the "max" of C(7,10,13). This is false so the next statements C-s2 to C-s4 are executed.

The statement C-s2 recurses the query on the left subtree of node C(7, 10,13). However, the left subtree of node C(7,10,13) is null, so the execution proceeds to statement C-s3. Statement C-s3, checks if the live interval of query node A(11,13,13) overlaps with node C(7,10,13). Since the "low" of query node A(11,13,13) is not between the "low" and "high" of node C(7,10,13), and the "high" of query node A(11,13,13) is not between the "low" and "high" of node C(7,10,13), query node A(11,13,13) does not overlap with node C(7,10,13).

Execution then continues to statement C-s4, which checks if the "high" of query node A(11,13,13) is less than the "low" of node C(7,10,13). This is true, so the query at this recursive level can be returned. Since all recursive levels have been return, the query for the interferences of tensor A is complete. The interference list of tensor A contains tensor B to indicate that tensor B is the only tensor that has a live interval overlapping with tensor A. Hence, the interreference graph would have only one edge from tensor A, which connects to tensor B.

A similar query process can be performed for each tensor to obtain the interference lists of the respective tensors to build the interference graph. The query for each tensor can also be performed in parallel to further speed up the generation of the interference graph. As compared to other techniques such as the triangular bitmap, the binary tree technique to generate the interference graph can be completed much faster (e.g., $O(\log N+k)$ as compared to $O(N^2)$), and is able to scale to complex neural network models that utilize a large number of tensors.

Figure 5:
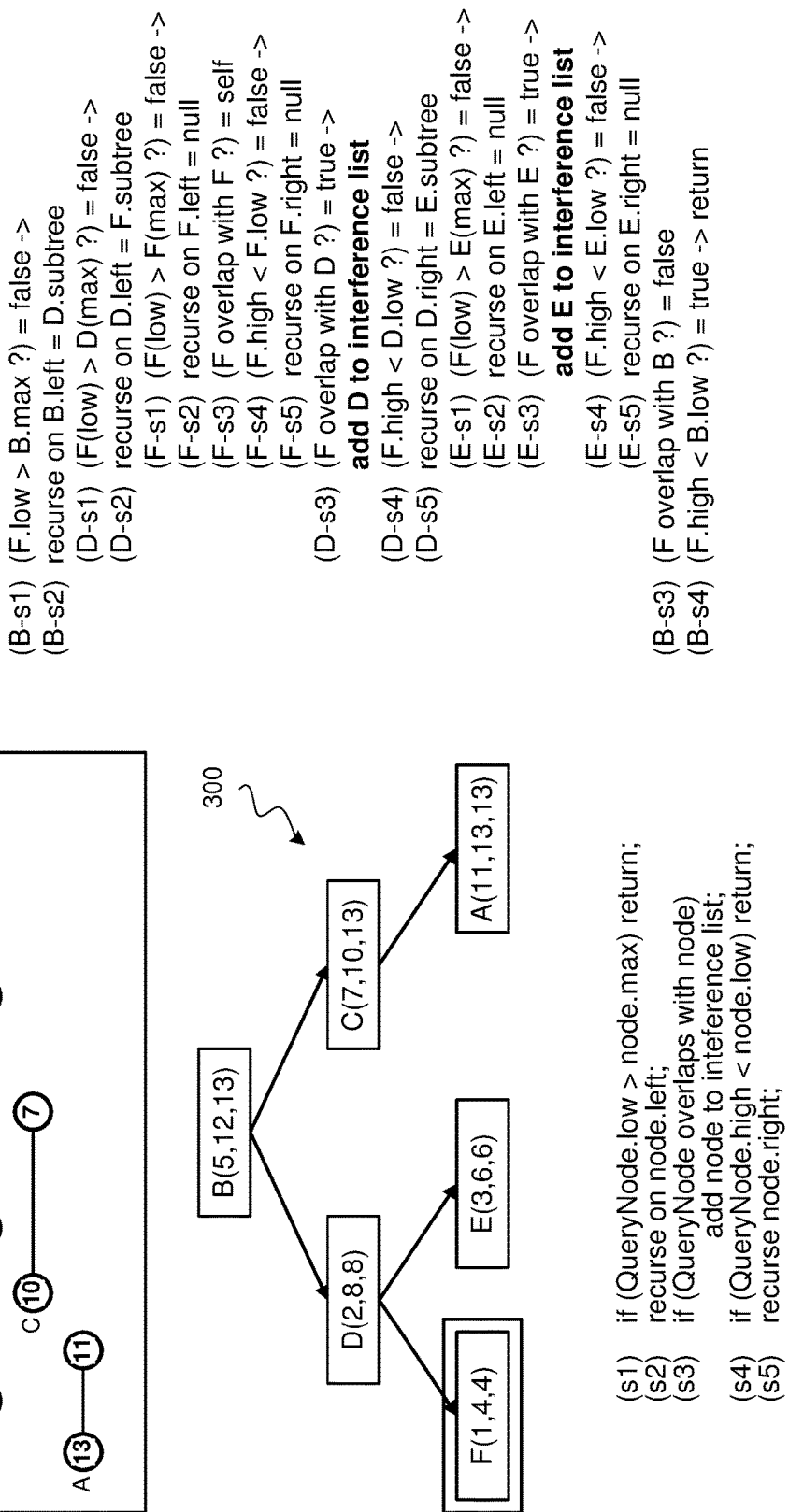
FIG. 5 shows another example of querying a binary tree for interferences.

FIG. 5 illustrate another example of querying a binary tree to obtain the interferences of a query node. For ease of reference, live intervals 210 and binary tree 300 from FIG. 3 are reproduced in FIG. 5 along with the pseudocode for obtaining the interferences. In the example of FIG. 5, the binary tree 300 is queried to obtain the interferences for tensor F, and hence the query node is set to "F." The querying process is similar that described above with reference to FIGS. 4A-E, and thus a detailed description of which need not be repeated. As shown with the pseudocode tracing, querying for the interferences of tensor F recurses to left side of the binary tree starting from node B, then to node D, node F, and node E. The right side of the binary tree 300 can be pruned from the interference search to reduce the interference graph generation time. The resulting interference list of tensor F includes tensor D and tensor E, which have overlapping live intervals with tensor F.

Figure 6:
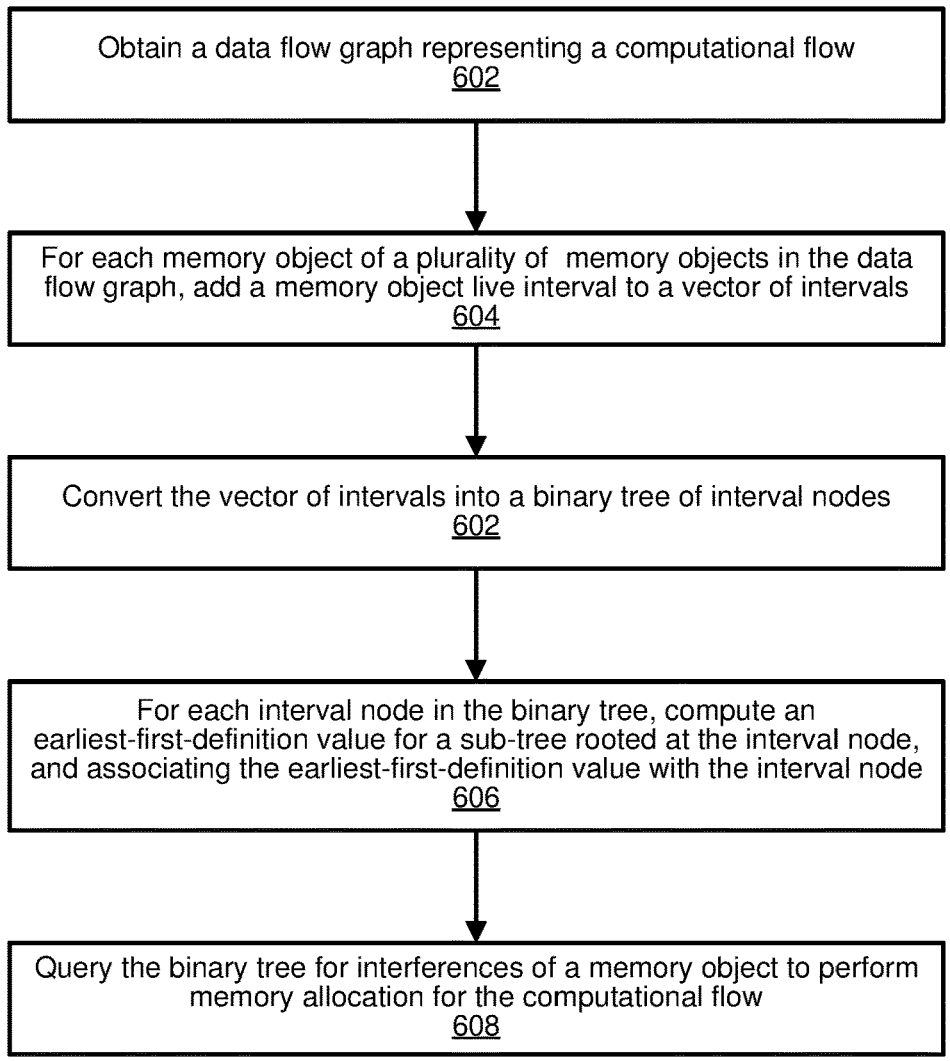
FIG. 6 shows a flow diagram of an example of a process to generate an interference graph.

FIG. 6 illustrates a flow diagram of an example of a process 600 for generating an interference graph for memory objects of a computational flow. The computational flow can be a neural network model, and the memory objects can be tensors utilized in the neural network model. The memory objects can also include other types of variables used during execution of a computational flow. Process 600 can be performed, for example, by a compiler that interprets programming code describing a computational flow, such as code describing a neural network model, and translates the programming code into machine instructions for execution on hardware (e.g., an integrated circuit device such as an acceleration engine).

The component in the compiler performing process 600 can be, for example, a memory allocator. The memory allocator may allocate memory locations in a buffer memory of the integrated circuit device for execution of the computational flow (e.g., an accelerator executing a neural network model) for the memory objects. In some implementations, process 600 can be implemented on a computer-readable medium that is executable by one or more processors of a computing system to compile the programming code of a computational flow for loading onto the integrated circuit device for execution. For example, machine code suitable for the integrated circuit device to execute the computational flow can be generated based on the memory allocation resulting from the interference graph generated by process 600.

Process 600 may begin at block 602 by obtaining a data flow graph representing a computational flow such as a neural network model. In some implementations, the representation of the computational flow can be an intermediate representation (IR) generated by the compiler based on a description of the computational flow received by the compiler. The description of the computational flow can be, for example, source code written in a high-level programming language such as Python, Java, C++, among other examples. In the context of neural network models, the source code may utilize software libraries tailored for neural networks such as TensorFlow, PyTorch, etc. The IR can represent a data flow graph having operators represented by nodes and data dependencies represented by edges connecting the nodes.

At block 604, for each memory object of a plurality of memory objects in the data flow graph, a memory object live interval can be added to a vector of intervals. For example, the data flow graph can be traversed in reverse order from an output of the data flow graph towards an input of the data flow graph. A live interval for each memory object in the order in which the memory objects are encountered can be added to the vector of intervals. The memory object live interval indicates a last-use of the memory object and a first-definition of the memory object.

At block 606, the vector of intervals can be converted into a binary tree of interval nodes. In implementations in which the data flow graph was traversed backwards when adding the memory object live intervals to the vector of intervals, the memory object live intervals will be pre-arranged in the order of last-use of the memory objects. In other implementations, the memory object live intervals can be sorted to put the memory object live intervals in the order of last-use of the memory objects. To convert the vector of intervals into a binary tree, the median of the vector of intervals can be used as the root of the binary tree. The median of the vector of intervals correspond to the middle of the order of last-use of the memory objects. The remaining nodes of the binary tree can be generated by taking the medians of the segments before and after the root of the binary tree in the vector of intervals. These medians can then be used as the root of the left sub-tree and the root of the right sub-tree, respectively. The process continues until all tensor live intervals from the vector of intervals have been converted into the binary tree.

At block 608, for each interval node in the binary tree, an earliest-first-definition value for a sub-tree rooted at the interval node can be determined, and the earliest-first-definition value can be associated with the corresponding interval node. The earliest-first-definition value is used in subsequent queries to determine the interferences of a memory object with other memory objects. More specifically, the earliest-first-definition value can be used to prune out sub-trees to reduce the query time.

At block 610, the binary tree can be queried for interferences of a memory object to perform memory allocation for the computational flow. The query can be performed for each memory object of the computational flow to generate an interference list of each corresponding memory object. The queries for respective memory objects can be performed in parallel to further speed up the interference graph generation. The interference list of each corresponding memory object represents the edges in the interference graph connecting the corresponding memory object to other memory objects. The interference list of each tensor can then be used to performing memory allocation for a buffer memory of an accelerator.

Figure 7:
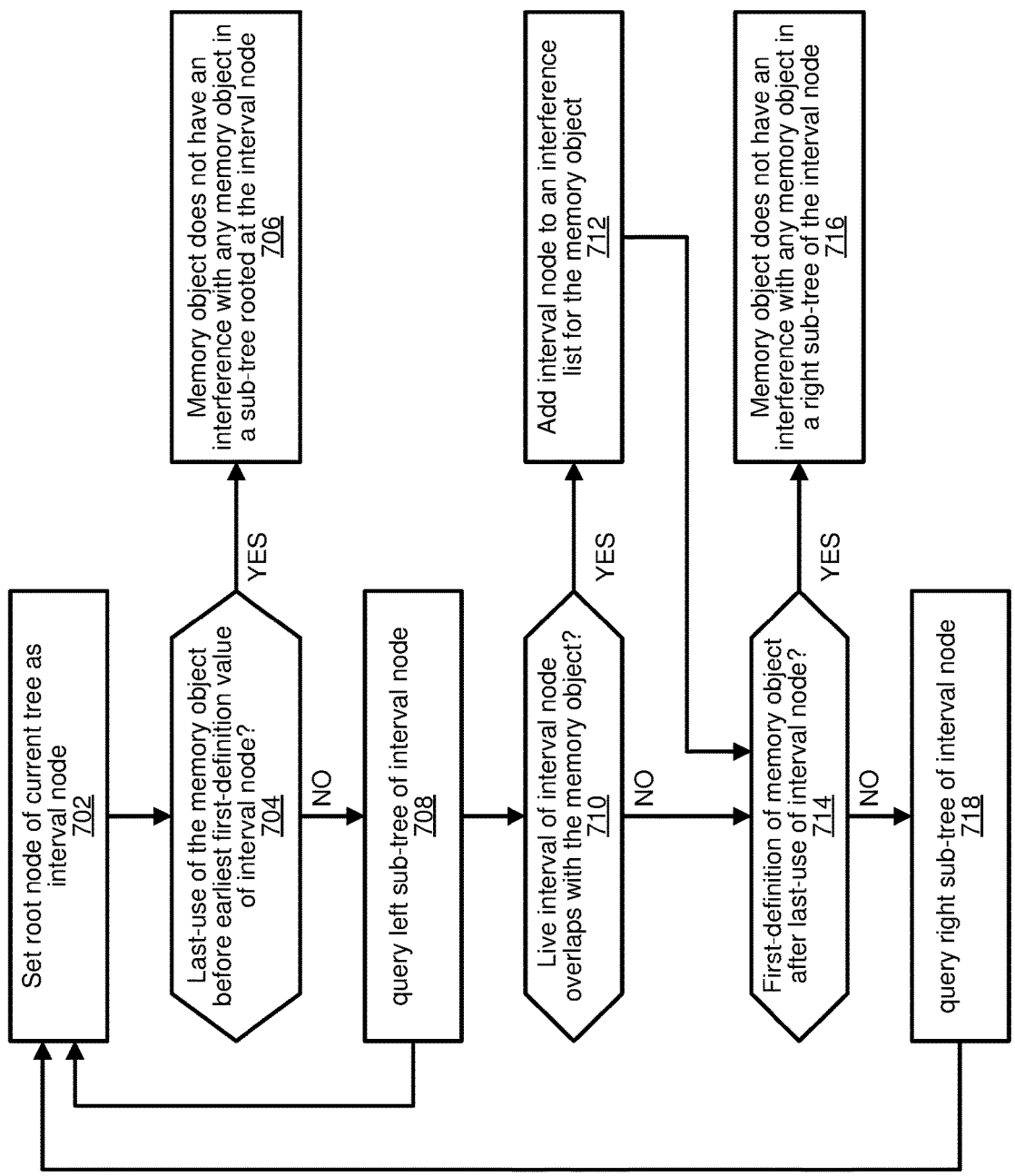
FIG. 7 shows a flow diagram of an example of a process to query a binary tree for interferences.

FIG. 7 illustrates a flow diagram of an example of a process 700 for querying a binary tree data structure for interferences of a memory object with other memory objects to generate an interference graph for a computational flow. Process 700 can be performed, for example, as part of block 610 in process 600, and can be a recursive process. The query for interferences may begin at the top root of the binary tree.

At block 702, the root node of the current tree level can be set as the interval node to check. At block 704, the last-use of the memory object being queried is compared with the earliest-first-definition value of the interval node to determine if the last-use of the memory object is before the earliest-first-definition value of the interval node. If the last-use of the memory object is before the earliest-first-definition value of the interval node, then at block 706, it can be determined that the memory object does not have an interference with any memory object in a sub-tree rooted at the interval node.

If the last-use of the memory object is after the earliest-first-definition value of the interval node, then at block 708, the left sub-tree of the interval node is queried. Process 700 recurses back to block 702 to set the left node as the root node/interval node for the next recursive level. Process 700 also proceeds to block 710. At block 710, a determination can be made if the interval node has a live interval that overlaps with the memory object. If the interval node has a live interval that overlaps with the memory object, then at block 712, the interval node is added to the interference list for the memory object.

Process 700 then continues to block 714. At block 714, the first-definition of the memory object is compared with the last-use of the interval node to determine if the first-definition of the memory object is after the last-use of the interval node. If the first-definition of the memory object is after the last-use of the interval node, then at block 716, it can be determined that the memory object does not have an interference with any memory object in a right sub-tree of the interval node. If the first-definition of the memory object is before the last-use of the interval node, then at block 718, the right sub-tree of the interval node is queried. Process 700 recurses back to block 702 to set the right node as the root node/interval node for the next recursive level.

In some implementations, process 700 can be performed in parallel to obtain the interference lists of respective memory objects utilized in the computational flow. The interference lists can be used to generate an interference graph in which nodes represent memory objects, and each interference list of a memory object represents edges in the interference graph connecting that memory object to other memory objects.

Figure 8:
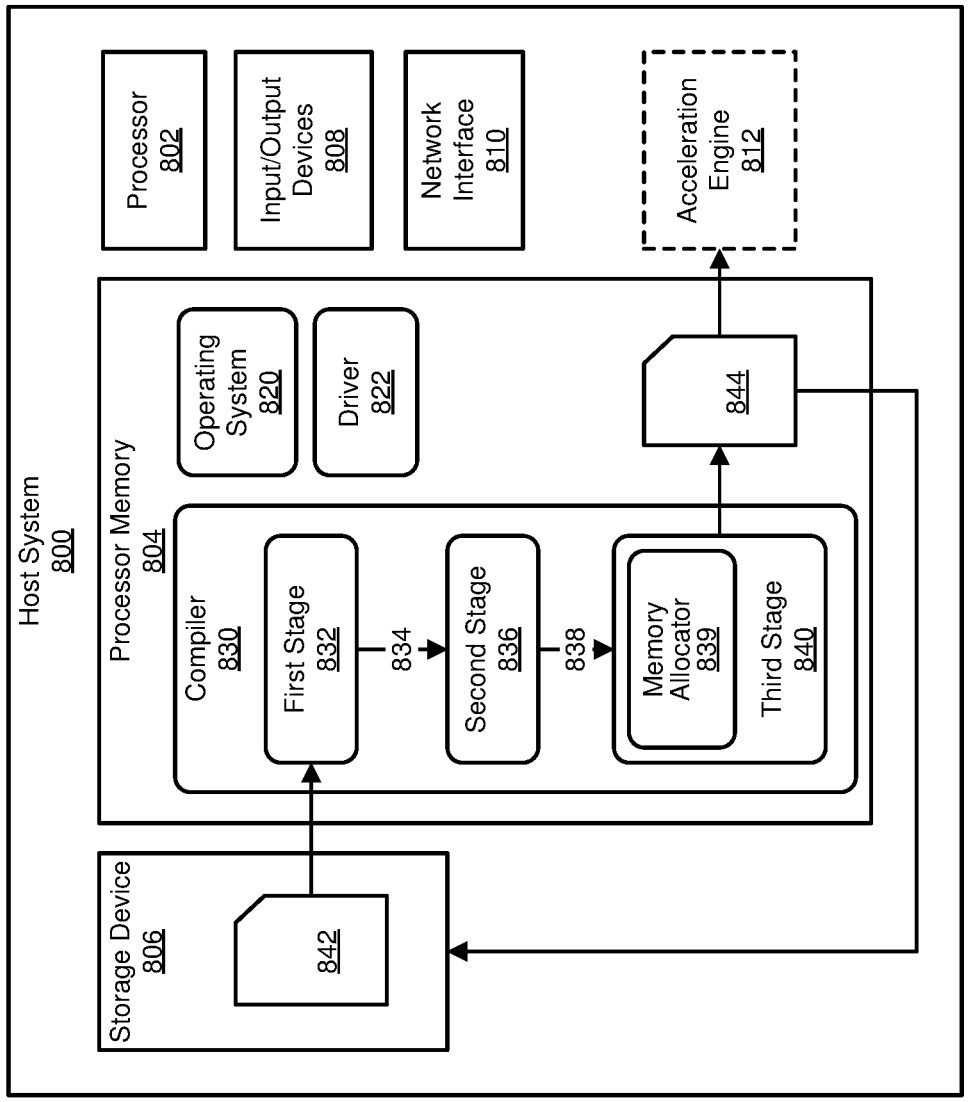
FIG. 8 illustrates a block diagram of an example of a compiler in a host system.

FIG. 8 includes a block diagram illustrating an example of a host system 800 on which a compiler 830, such as is described herein, can run. The illustrated host system 800 is an example of a computing device, and includes a processor 802, a processor memory 804, at least one storage device 806, various Input/Output (I/O) devices 808, and at least one network interface 810. In the example of FIG. 1, the host system 800 also includes an acceleration engine 812, which is an integrated circuit device that can accelerate certain operations or computations performed by the host system 800. In various examples, the host system 800 can be implemented as a server in a data center, a desktop computer, a laptop computer, a tablet computer, or a smartphone, among other examples. In some examples, operations or components discussed below as being performed or included in the host system 800 can be performed or included in other computer devices. For example, the compiler 830 can execute on the host system 800 while the acceleration engine 812 is located at a different host system.

The processor 802 is an integrated circuit device that can execute program code, in the form of instructions. The program code can be for various software applications or tools, such as an operating system 820 or the illustrated compiler 830. While the processor 802 is executing a program, the instructions for the program can be stored in the processor memory 804. The instructions can also be stored elsewhere, such as on the storage device 806, and can be loaded into the processor memory 804 when needed by the processor 802. The processor 802 can also use the processor memory 804 for temporary storage of other data on which the processor 802 is operating. In various examples, the processor memory 804 is a volatile memory type, such as a type of Random Access Memory, though non-volatile memory types can, alternatively or additionally, be used for the processor memory 804.

The storage device 806 is an example of a device that can include non-volatile memory. For example, the storage device 806 can be a magnetic disk drive, a solid state drive, or an optical drive, among other examples. The storage device 806 can further be non-transitory, such that program code and other data stored on the storage device 806 remains present when the storage device 806 is not powered on.

The storage device 806 is one example of a peripheral device, which are components that can be coupled to the host system 800 to add functionality to the host system 800. Other examples of peripheral devices include the Input/Output devices 808 and the network interface 810. The Input/Output devices 808 can include user input and output devices, such as keyboards, mice, touch screens, microphones, display screens, speakers, printers, and scanners, among other examples. The network interface 810, which can be implemented using a network interface card, can provide access to one or more networks. The network interface 810 can include, for example, a physical port for connecting a network cable and/or wireless antennas for communicating with Wi-Fi and/or cellular networks. The network interface 810 can also be described as an I/O device.

The acceleration engine 812 is also another type of peripheral device or I/O device. The acceleration engine 812 is a device that is purpose-built to perform certain operations that can be performed by the processor 802, but can be performed faster by the acceleration engine 812. For example, the acceleration engine 812 can be a neural network accelerator, and, as such, may be able to perform the large scale, parallel computations of a neural network more efficiently than when the computations are performed by the processor 802. As another example, the acceleration engine 812 can be a graphics processing unit (GPU), and may be optimized to perform the computations needed for graphics rendering. Other examples of devices that can be implemented by the acceleration engine 812 include cryptographic accelerators, compression and decompression accelerators, 3-D accelerators, regular expression accelerators, security accelerators, and others.

In various examples, the acceleration engine 812 can execute program code to perform certain operations. For example, when the acceleration engine 812 is a neural network accelerator, the acceleration engine 812 can be programmed to execute a particular neural network, such as one that performs image recognition or one that performs machine translation. As a further example, to support the execution of a neural network, the acceleration engine 812 can be programed to perform operations such as copying data for the neural network from processor memory 804 (for example) into the acceleration engine 812, copying input data for the neural network from processor memory 804 into the acceleration engine 812, and/or copying results from the acceleration engine 812 into the processor memory 804, among other examples.

To generate program code for the acceleration engine 812, in various examples, the host system 100 can execute the compiler 830. Compilers, in general, are software programs that translate program code written in a human-readable language into a format (e.g., machine instructions) that can be read and processed by an integrated circuit device. In the example of FIG. 8, the acceleration engine 812 is a neural network accelerator and the compiler 830 is for compiling a neural network description into instructions to be executed by the acceleration engine 812. When the acceleration engine 812 implements a different type of accelerator, another compiler can be used.

The compiler 830 can be activated, for example, when the operating system 820 receives keyboard, mouse, touch-screen, voice commands, or other inputs from the Input/Output devices 808. The inputs can further include parameters for the compiler 830, such as the input code 842 to compile and configuration options for the compilation process. Once the compiler 830 is activated, the processor 802 can load the instructions for the compiler 830 into the processor memory 804, and can execute the instructions.

In the example of FIG. 8, the compiler 830 includes a first stage 832, a second stage 836, and a third stage 840, which each perform different operations to produce compiled code 844. In other examples, the compiler 830 can combine the operations of the first stage 832, second stage 836, and/or third stage 840 into fewer stages, or can divide the operations of one of the stages into multiple stages.

The first stage 832 can receive and process input code 842. The input code 842 can describe a program in a high-level programming language, such as Java, C++, or Tensorflow, among many other examples. The input code 842 can describe, for example, steps to perform image recognition, speech recognition, machine translation, or other operations. The input code 842 can be obtained, for example, from the storage device 806. Alternatively, though not illustrated here, the input code 842 may be located in the processor memory 804 or can be obtained from a network location, using the network interface 810. Processing of the input code 842 can include sorting the operations described in the input code 842 into layers, where the outputs of one layer provide the inputs to a next layer. Processing can also include identifying steps to be performed by the processor 802, rather than by the acceleration engine 812. For example, the processor 802, through the execution of a driver 822, may need to perform steps such as configuring Direct Memory Access (DMA) descriptors for moving data into or out of the acceleration engine 812, among other examples.

The output 834 of the first stage 832 can be organized, for example, in the layers, nodes, and connections between nodes of a neural network. The second stage 836 can perform intermediate processing on this output 834. For example, the operations performed in any one layer, or at any one node in a layer, may be too many for the acceleration engine 812 to perform at the same time. The acceleration engine 812 may, for example, have a limited amount of locale storage space for the data needed for a computation, or the computations may be more than the acceleration engine 812 can perform at one time. In this example, the first stage 832 can break the operations of the layer or node down into smaller operations, which can fit into the acceleration engine's local memory and/or can fit into the computing capacity of the acceleration engine 812. Processing of the output 834 of the first stage 832 can include other steps, such as scheduling, or determining the order in which the acceleration engine 812 and/or processor 802 will perform operations, among other examples.

In various examples, the output 838 of the second stage 836 includes the various steps to be performed by components of the acceleration engine 812, in the order that the steps are to be performed. The output 838 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 840 can operate on the output 838 of the second stage 836, and perform various steps before producing the instructions that are to be executed by the acceleration engine 812. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 840 can include a memory allocator 839 to generate an interference graph and perform memory allocation for variables and/or tensors used during runtime execution of acceleration engine 812.

The output of the third stage 840 is compiled code 844, which may include machine instructions in binary format. In some examples, the compiled code 844 can be stored in the processor memory 804. Alternatively or additionally, the compiled code 844 can be copied to the storage device 806 or to a network location. As noted above, the acceleration engine 812 may be located at a different host system, in which case the compiled code 844 can be sent over the network interface 810 to the other host system.

In the example of FIG. 8, the host system 800 can be executing a driver 822, which can also be referred to as a device driver or runtime driver, that manages the acceleration engine 812. The driver 822 can provide an interface between applications executing on the host system 800 (or on another host system) and the acceleration engine 812. For example, the driver 822 can provide an Application Program Interface (API) that defines functions for feeding input data to the acceleration engine 812 and defining the operation to perform on the input data. In this and other examples, the driver 822 can configure the acceleration engine 812 to perform the operation. For example, the driver 822 can identify a neural network that the acceleration engine 812 is to execute, as well as the location in the processor memory 804 or on the storage device 806 where the compiled code 844 for the neural network is located. The driver 822 can further load into the acceleration engine 812 or cause the acceleration engine 812 to load the compiled code 844, can load or cause the acceleration engine 812 to load the input data on which the neural network is to operate, and/or can cause the acceleration engine 812 to being executing on the input data. Once the acceleration engine 812 has finished, the acceleration engine 812 can notify the driver 822, and the driver 822 can deliver a result back to the application that requested the result.

Figure 9:
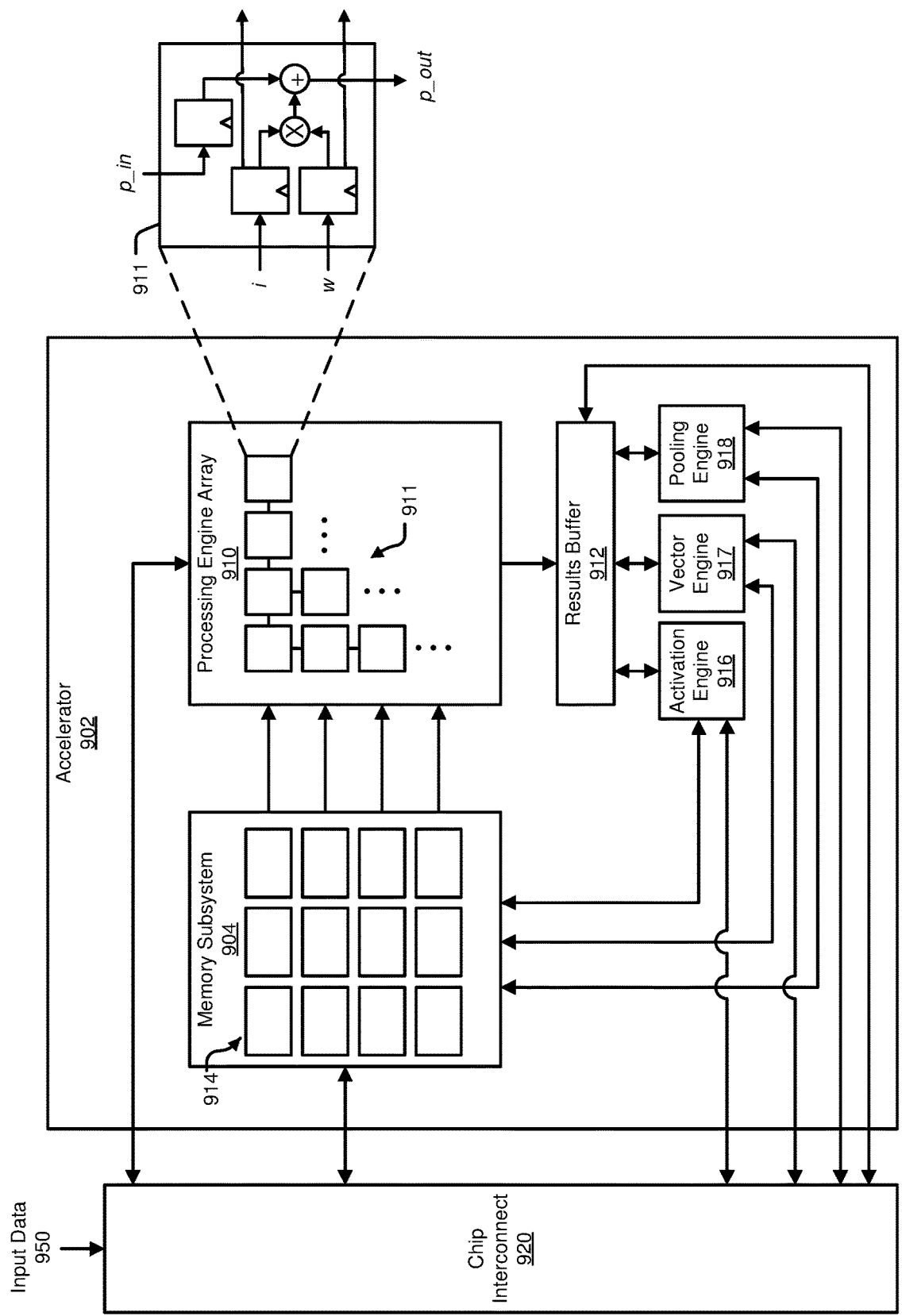
FIG. 9 illustrates a block diagram of an example of an integrated circuit device.

FIG. 9 is a block diagram illustrating an example of a processing integrated circuit device that can be used as a processing core. The example of FIG. 9 illustrates an accelerator 902. In various examples, the accelerator 902, for a set of input data (e.g., input data 950), can execute computations using a processing engine array 910, an activation engine 916, and/or a pooling engine 918. In some examples, the example accelerator 902 may be an integrated circuit component of a processor, such as a neural network processor. The processor may have other integrated circuit components, including additional accelerator engines.

In various implementations, the memory subsystem 904 can include multiple memory banks 914. In these implementations, each memory bank 914 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 914. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 904 can permit simultaneous access to the read or write channels of multiple memory banks. As another example, the memory subsystem 904 can include arbitration logic such that arbitration between, for example, the outputs of multiple memory banks 914 can result in more than one memory bank's output being used. In these and other examples, though globally managed by the memory subsystem 904, each memory bank can be operated independently of any other.

Having the memory banks 914 be independently accessible can increase the efficiency of the accelerator 902. For example, values can be simultaneously read and provided to each row of the processing engine array 910, so that the entire processing engine array 910 can be in use in one clock cycle. As another example, the memory banks 914 can be read at the same time that results computed by the processing engine array 910 are written to the memory subsystem 904. In contrast, a single memory may be able to service only one read or write at a time. With a single memory, multiple clock cycles can be required, for example, to read input data for each row of the processing engine array 910 before the processing engine array 910 can be started.

In various implementations, the memory subsystem 904 can be configured to simultaneously service multiple clients, including the processing engine array 910, the activation engine 916, the pooling engine 918, and any external clients that access the memory subsystem 904 over a communication fabric 920. In some implementations, being able to service multiple clients can mean that the memory subsystem 904 has at least as many memory banks as there are clients. In some cases, each row of the processing engine array 910 can count as a separate client. In some cases, each column of the processing engine array 910 can output a result, such that each column can count as a separate write client. In some cases, output from the processing engine array 910 can be written into the memory banks 914 that can then subsequently provide input data for the processing engine array 910. As another example, the activation engine 916 and the pooling engine 918 can include multiple execution channels, each of which can be separate memory clients. The memory banks 914 can be implemented, for example, using static random access memory (SRAM).

In various implementations, the memory subsystem 904 can include control logic. The control logic can, for example, keep track of the address spaces of each of the memory banks 914, identify memory banks 914 to read from or write to, and/or move data between the memory banks 914. In some implementations, memory banks 914 can be hardwired to particular clients. For example, a set of memory banks 914 can be hardwired to provide values to the rows of the processing engine array 910, with one memory bank servicing each row. As another example, a set of memory banks can be hard wired to receive values from columns of the processing engine array 910, with one memory bank receiving data for each column.

The processing engine array 910 is the computation matrix of the example accelerator 902. The processing engine array 910 can, for example, execute parallel integration, convolution, correlation, and/or matrix multiplication, among other things. The processing engine array 910 includes multiple processing engines 911, arranged in rows and columns, such that results output by one processing engine 911 can be input directly into another processing engine 911. Processing engines 911 that are not on the outside edges of the processing engine array 910 thus can receive data to operate on from other processing engines 911, rather than from the memory subsystem 904.

In various examples, the processing engine array 910 uses systolic execution, in which data arrives at each processing engine 911 from different directions at regular intervals. In some examples, input data can flow into the processing engine array 910 from the left and weight values can be loaded at the top. In some examples weights and input data can flow from the left and partial sums can flow from top to bottom. In these and other examples, a multiply-and-accumulate operation moves through the processing engine array 910 as a diagonal wave front, with data moving to the right and down across the array. Control signals can be input at the left at the same time as weights, and can flow across and down along with the computation.

In various implementations, the number of columns in the processing engine array 910 determines the computational capacity of the processing engine array 910, and the number of rows determines the required memory bandwidth for achieving maximum utilization of the processing engine array 910. The processing engine array 910 can have, for example, 64 columns and 428 rows, or some other number of columns and rows.

An example of a processing engine 911 is illustrated in FIG. 9 in an inset diagram. As illustrated by this example, a processing engine 911 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 911.

In the illustrated example, an input from above can include a partial sum, p_in, provided either from another processing engine 911 or from a previous round of computation by the processing engine array 910. When starting a computation for a new set of input data, the top row of the processing engine array 910 can receive a fixed value for p_in, such as zero. As illustrated by this example, i and w are multiplied together and the result is summed with p_in to produce a new partial sum, p_out, which can be input into another processing engine 911. Various other implementations of the processing engine 911 are possible.

Outputs from the last row in the processing engine array 910 can be temporarily stored in the results buffer 912. The results can be intermediate results, which can be written to the memory banks 914 to be provided to the processing engine array 910 for additional computation. Alternatively, the results can be final results, which, once written to the memory banks 914 can be read from the memory subsystem 904 over the communication fabric 920, to be output by the system.

In some implementations, the accelerator 902 includes an activation engine 916. In these implementations, the activation engine 916 can combine the results from the processing engine array 910 into one or more output activations. For example, for a convolutional neural network, convolutions from multiple channels can be summed to produce an output activation for a single channel. In other examples, accumulating results from one or more columns in the processing engine array 910 may be needed to produce an output activation for a single node in the neural network. In some examples, activation engine 916 can be bypassed.

In various examples, the activation engine 916 can include multiple separate execution channels. In these examples, the execution channels can correspond to the columns of the processing engine array 910, and can perform an operation on the outputs of a column, the result of which can be stored in the memory subsystem 904. In these examples, the activation engine 916 may be able to perform between 1 and n parallel computations, where n is equal to the number of columns in the processing engine array 910. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 902 can include a pooling engine 918. Pooling is the combining of outputs of the columns of the processing engine array 910. Combining can include for example, computing a maximum value, a minimum value, an average value, a median value, a summation, a multiplication, or another logical or mathematical combination. In various examples, the pooling engine 918 can include multiple execution channels that can operating on values from corresponding columns of the processing engine array 910. In these examples, the pooling engine 918 may be able to perform between 1 and n parallel computations, where n is equal to the number of columns in the processing engine array 910. In various examples, execution channels of the pooling engine 918 can operate in parallel and/or simultaneously. In some examples, the pooling engine 918 can be bypassed.

Herein, the activation engine 916 and the pooling engine 918 may be referred to collectively as execution engines. The processing engine array 910 is another example of an execution engine. Another example of an execution engine is a Direct Memory Access (DMA) engine, which may be located outside the accelerator 902.

Input data 950 can arrive over the communication fabric 920. The communication fabric 920 can connect the accelerator 902 to other components of a processor, such as a DMA engine that can obtain input data 950 from an Input/Output (I/O) device, a storage drive, or a network interface. The input data 950 can be, for example one-dimensional data, such as a character string or numerical sequence, or two-dimensional data, such as an array of pixel values for an image or frequency and amplitude values over time for an audio signal. In some examples, the input data 950 can be three-dimensional, as may be the case with, for example, the situational information used by a self-driving car or virtual reality data. In some implementations, the memory subsystem 904 can include a separate buffer for the input data 950. In some implementations, the input data 950 can be stored in the memory banks 914 when the accelerator 902 receives the input data 950.

In some examples, the accelerator 902 can implement a neural network processing engine. In these examples, the accelerator 902, for a set of input data 950, can execute a neural network to perform a task for which the neural network was trained. Executing a neural network on a set of input data can be referred to as inference or performing inference.

The weights for the neural network can be stored in the memory subsystem 904, along with input data 950 on which the neural network will operate. The neural network can also include instructions, which can program the processing engine array 910 to perform various computations on the weights and the input data. The instructions can also be stored in the memory subsystem 904, in the memory banks 914 or in a separate instruction buffer. The processing engine array 910 can output intermediate results, which represent the outputs of individual layers of the neural network. In some cases, the activation engine 916 and/or pooling engine 918 may be enabled for computations called for by certain layers of the neural network. The accelerator 902 can store the intermediate results in the memory subsystem 904 for inputting into the processing engine array 910 to compute results for the next layer of the neural network. The processing engine array 910 can further output final results from a last layer of the neural network. The final results can be stored in the memory subsystem 904 and then be copied out to host processor memory or to another location.

Figure 10:
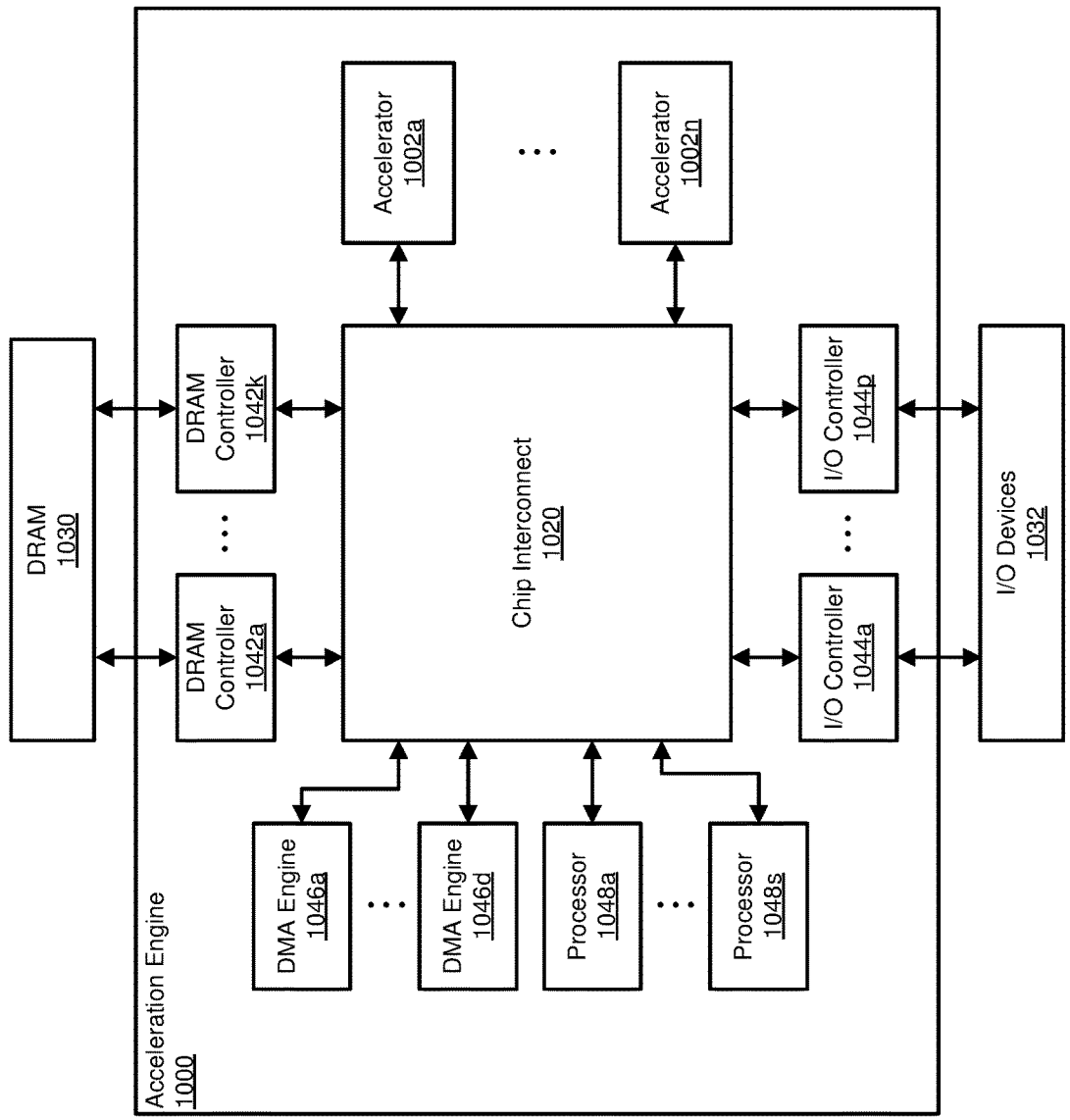
FIG. 10 illustrates a block diagram of an example of an acceleration engine.

FIG. 10 includes a block diagram that illustrates an example of an acceleration engine 1000. The acceleration engine 1000 is an example of an integrated circuit that can include one or more accelerators 1002a-1002n that may be similar to the accelerator illustrated in FIG. 9.

In the example of FIG. 10, the acceleration engine 1000 includes multiple accelerators 1002a-1002n, each of which can perform a set of operations. In various examples, the accelerators 1002a-1002n are for particular types of operations, so that the accelerators 1002a-1002n can perform the operations much faster than when similar operations are performed by a general-purpose processor. In various examples, to perform a set of operations, input data on which the operations are to be performed must first be moved into the accelerators 1002a-1002n. Additionally, in some cases, program code is also moved into the accelerators 1002a-1002n, which programs the operations that the accelerators 1002a-1002n will perform on the data. In the illustrated example, the acceleration engine 1000 includes n accelerators 1002a-1002n. Examples of accelerators that can be included in the acceleration engine 1000 include graphics accelerators, floating point accelerators, neural network accelerators, and others. In various examples, the accelerators 1002a-1002n can each be the same (e.g., each of the is a graphics accelerator) or can be different (e.g., the accelerators 1002a-1002n include a graphics accelerator, a floating-point accelerator, and neural network accelerator).

The example acceleration engine 1000 further includes DRAM controllers 1042a-1042k for communicating with an external memory. The external memory is implemented, in this example, using DRAM 1030. In the illustrated example, the acceleration engine 1000 includes k DRAM controllers 1042a-1042k, each of which may be able to communicate with an independent set of banks of DRAM. In other examples, other types of RAM technology can be used for the external memory. The DRAM controllers 1042a-1042k can also be referred to as memory controllers.

In various examples, input data and/or program code for the accelerators 1002a-1002n can be stored in the DRAM 1030. Different programs can cause the accelerators 1002a-1002n to perform different operations. For example, when one of the accelerators is a neural network accelerator, one program can configure the neural network accelerator to perform speech recognition while another program can configure the neural network accelerator to perform image recognition. In various examples, different accelerators 1002a-1002n can be programmed with different programs, so that each performs a different set of operations. In various examples, the processors 1048a-1048s can manage moving of program code from the DRAM 1030 to the accelerators 1002a-1002n.

The example acceleration engine 1000 further includes I/O controllers 1044a-1044p for communicating with I/O devices 1032 in the system. The acceleration engine 1000 can communicate with I/O devices over, for example, a processor bus. In some examples, the processor bus can be implemented using Peripheral Component Interconnect (PCI) and/or a variation of the PCI bus protocol. The processor bus can connect the acceleration engine 1000 to I/O devices such as, for example, input and output devices, memory controllers, storage devices, and/or network interface cards, among other things. In some examples, the I/O controllers 1044-1044p can enable the acceleration engine 1000 to act as an I/O device for a host processor. For example, the acceleration engine 1000 can be the recipient of input data from the host processor, and a command indicating an operation to be performed on the input data (e.g., a particular computation or analysis). In the illustrated example, the acceleration engine 1000 includes p I/O controllers 1044a-1044p, each of which may include a separate root complex and may communicate with a separate set of I/O devices 1032. In other examples, other standardized bus protocols, such as Ultra Path Interconnect (UPI) can be used for the host bus. In other examples, a proprietary bus protocol can be used.

Movement of data in the acceleration engine 1000 can be managed by one or more processors 1048a-1048s, which can also be referred to as data management processors. In the example of FIG. 10, the acceleration engine 1000 includes s processors 1048a-1048s incorporated into the device (e.g., on the same silicon die). In other examples, the processors 1048a-1048s can be external to the acceleration engine 1000 (e.g., on a different die and/or in a different package). In some examples, the processors 1048a-1048s can manage the movement of data from I/O devices 1032 to the accelerators 1002a-1002n or the DRAM 1030. For example, input data may be located at an I/O device 1032 or in processor memory, and the processors 1048a-1048s can move the input from the I/O device 1032 or processor memory into an accelerator or into DRAM 1030. As another example, program code for the accelerators 1002a-1002n may be located on an I/O device 1032 or in processor memory.

The example acceleration engine 1000 further includes DMA engines 1046a-1046d that can move data between the accelerators 1002a-1002n, DRAM controllers 1042a-1042k, and I/O controllers 1044a-1044p. In the illustrated example, the acceleration engine 1000 includes d DMA engines 1046a-1046d. In some implementations, the DMA engines 1046*a*-1046*d* can be assigned to specific tasks, such as moving data from the DRAM controllers 1042*a*-1042*d* to the accelerators 1002*a*-1002*n*, or moving data between the I/O controllers 1044*a*-1044*p* and the accelerators 1002*a*-1002*n*. These tasks can be assigned, for example, by enqueueing descriptors with the DMA engines 1046*a*-1046*d*, where a descriptor identifies an address for a block of data and an operation (e.g., a read or a write) to perform. A descriptor, for example, can direct a DMA engine to instruct a DMA controller to read a block of data from DRAM 1030. A descriptor can, as a further example, instruct the DMA engine to write data, read by the DMA controller, to an accelerator. Further descriptors can be used to move data from an accelerator to DRAM 1030.

In various examples, each of the processors 1048*a*-1048*s* can be responsible for managing the data movement for a different accelerator. In some examples, a processor may manage the data movement for more than one accelerator. Similarly, in various examples, each of the processors 1048*a*-1048*s* can be assigned to one or more DMA engines 1046*a*-1046*d*. In these and other examples, associations between processors 1048*a*-1048*s*, accelerators 1002*a*-1002*n*, and DMA engines 1046*a*-1046*d* are determined by program code being executed by each respective processor.

In the example acceleration engine 1000, the various components can communicate over a chip interconnect 1020. The chip interconnect 1020 primarily includes wiring for routing data between the components of the acceleration engine 1000. In some cases, the chip interconnect 1020 can include a minimal amount of logic, such as multiplexors to control the direction of data, flip-flops for handling clock domain crossings, and timing logic.

Figure 11:
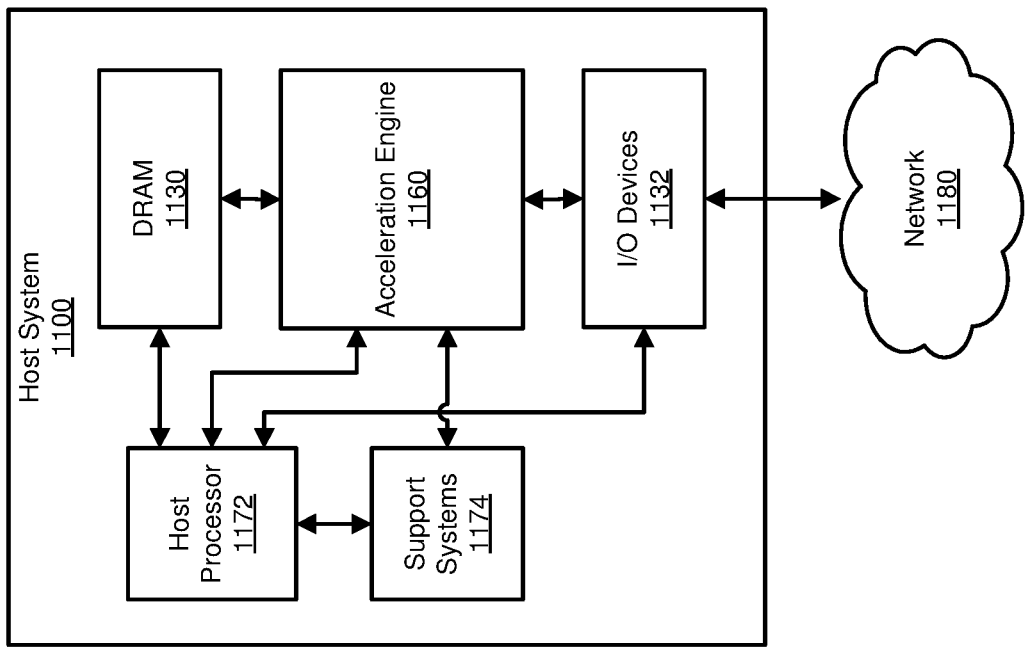
FIG. 11 illustrates a block diagram of an example of a host system.

FIG. 11 includes a block diagram that illustrates an example of a host system 1100 in which an acceleration engine 1160 can be used. The acceleration engine 1160 of FIG. 11 is an example of a device that can include one or more accelerators such as is illustrated in FIG. 10. The example host system 1100 of FIG. 11 includes the acceleration engine 1160, a host processor 1172, DRAM 1130 or processor memory, I/O devices 1132, and support systems 1174. In various implementations, the host system 1100 can include other hardware that is not illustrated here.

The host processor 1172 is a general-purpose integrated circuit that is capable of executing program instructions. In some examples, the host processor 1172 can include multiple processing cores. A multi-core processor may include multiple processing units within the same processor. In some examples, the host system 1100 can include more than one host processor 1172. In some examples, the host processor 1172 and the acceleration engine 1160 can be one chip, such as, one or more integrated circuits within the same package.

In various examples, the host processor 1172 can communicate with other components in the host system 1100 over one or more communication channels. For example, the host system 1100 can include a host processor bus, which the host processor 1172 can use to communicate with the DRAM 1130, for example. As another example, the host system 1100 can include an I/O bus, such as a PCI-based bus, over which the host processor 1172 can communicate with the acceleration engine 1160 and/or the I/O devices 1132, for example. In various examples, the host system 1100 can, alternatively or additionally, include other communication channels or busses, such as serial busses, power management busses, storage device busses, and so on.

In some examples, software programs executing on the host processor 1172 can receive or generate input for processing by the acceleration engine 1160. In some examples, the programs can select an appropriate neural network to execute for a given input. For example, a program may be for language translation, and can select one or more neural networks capable of speech recognition and/or machine translation. In these and other examples, the programs can configure the acceleration engine 1160 with the neural network to execute, and/or can select a neural network processing engine on the acceleration engine 1160 that has previously been configured to execute the desired neural network. In some examples, once the acceleration engine 1160 has started an inference on input data, the host processor 1172 can manage the movement of data (such as weights, instructions, intermediate results, results of conditional layers, and/or final results) into or out of the acceleration engine 1160.

In some examples, a software program that is using the acceleration engine 1160 to conduct an inference can read the result from a conditional layer from the acceleration engine 1160 and/or from a storage location, such as in DRAM 1130. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1130 is memory that is used by the host processor 1172 for storage of program code that the host processor 1172 is in the process of executing, as well as values that are being operated on. In some examples, the data for a neural network (e.g., weight values, instructions, and other data) can be all or partially stored in the DRAM 1130. DRAM is a common term for processor memory, and though DRAM is volatile memory, processor memory can be volatile and/or non-volatile. Though not illustrated here, the host system 1100 can include other volatile and non-volatile memories for other purposes. For example, the host system 1100 can include a Read-Only Memory (ROM) that stores boot code for booting the host system 1100 at power on, and/or Basic Input/Output System (BIOS) code.

Though not illustrated here, the DRAM 1130 can store instructions for various programs, which can be loaded into and be executed by the host processor 1172. For example, the DRAM 1130 can be storing instructions for an operating system, one or more data stores, one or more application programs, one or more drivers, and/or services for implementing the features disclosed herein.

The operating system can manage and orchestrate the overall operation of the host system 1100, such as scheduling tasks, executing applications, and/or controller peripheral devices, among other operations. In some examples, a host system 1100 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers.

Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1100. For example, some drivers can provide communication between the operating system and peripheral devices or I/O devices 1132. Alternatively or additionally, some drivers may provide communication between application programs and the operating system, and/or application programs and peripheral devices accessible to the host system 1100. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1132 can include hardware for connecting to user input and output devices, such as keyboards, mice, pens, tablets, voice input devices, touch input devices, displays or monitors, speakers, and printers, among other devices. The I/O devices 1132 can also include storage drives and/or network interfaces for connecting to a network 1180. For example, the host system 1100 can use a network interface to communicate with storage devices, user terminals, other computing devices or servers, and/or other networks, among various examples.

In various examples, one or more of the I/O devices 1132 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1100 or may be in an external enclosure. A storage device can be fixed (e.g., attached by screws) or removable (e.g., having a physical release mechanism and possibly a hot-plug mechanism).

Storage devices, the DRAM 1130, and any other memory component in the host system 1100 are examples of computer-readable storage media. Computer-readable storage media are physical mediums that are capable of storing data in a format that can be read by a device such as the host processor 1172. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1132 can be PCI-based devices. In these examples, a PCI-based I/O device includes a PCI interface for communicating with the host system 1100. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1174 can include hardware for coordinating the operations of the acceleration engine 1160. For example, the support systems 1174 can include a microprocessor that coordinates the activities of the acceleration engine 1160, including moving data around on the acceleration engine 1160. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1172. In some examples, the program executed by the microprocessor is stored on the hardware of microprocessor, or on a non-volatile memory chip in the host system 1100. In some examples, the microprocessor and the acceleration engine 1160 can be on chip, such as one integrated circuit on the same die and in the same package.

In some examples, the support systems 1174 can be responsible for taking instructions from the host processor 1172 when programs executing on the host processor 1172 request the execution of a neural network. For example, the host processor 1172 can provide the support systems 1174 with a set of input data and a task that is to be performed on the set of input data. In this example, the support systems 1174 can identify a neural network that can perform the task, and can program the acceleration engine 1160 to execute the neural network on the set of input data. In some examples, the support systems 1174 only needs to select an appropriate neural network processing engine of the neural network processor. In some examples, the support systems 1174 may need to load the data for the neural network onto the acceleration engine 1160 before the acceleration engine 1160 can start executing the neural network. In these and other examples, the support systems 1174 can further receive the output of executing the neural network, and provide the output back to the host processor 1172.

In some examples, the operations of the support systems 1174 can be handled by the host processor 1172. In these examples, the support systems 1174 may not be needed and can be omitted from the host system 1100.

In various examples, the host system 1100 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1100 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

FIG. 12 includes a diagram of an example network 1200, which can include one or more host systems, such as the host system illustrated in FIG. 11. For example, the example network 1200 of FIG. 12 includes multiple nodes 1202a-1202h, one or more of which can be a host system such as is illustrated in FIG. 11. Others of the nodes 1202a-1202h can be other computing devices, each of which include at least a memory for storing program instructions, a processor for executing the instructions, and a network interface for connecting to the network 1200.

In various examples, the network 1200 can be used to process data. For example, input data can be received at one of the nodes 1202a-1202h or from other networks 1208 with which the network 1200 can communicate. In this example, the input data can be directed to a node in the network 1200 that includes an acceleration engine, for the acceleration engine to operate on and produce a result. The result can then be transferred to the node or other network from which the input data was received. In various examples, input data can be accumulated from various sources, including one or more of the nodes 1202a-1202h and/or computing devices located in the other networks 1208, and the accumulated input data can be directed to one or more host systems in the network 1200. Results from the host systems can then be distributed back to the sources from which the input data was gathered.

In various examples, one or more of the nodes 1202a-1202h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 12, the nodes 1202a-1202h are connected to one another using a switched architecture with point-to point links. The switched architecture includes multiple switches 1204a-1204d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1204a-1204d of FIG. 12 may be connected to the nodes 1202a-1202h and provide multiple paths between any two nodes.

The network 1200 may also include one or more network devices for connection with other networks 1208, such as a router 1206. Routers use headers and forwarding tables to determine the best path for forwarding the packets, and use protocols such as internet control message protocol (ICMP) to communicate with each other and configure the best route between any two devices. The router 1206 of FIG. 12 can be used to connect to other networks 1208 such as subnets, LANs, wide area networks (WANs), and/or the Internet.

In some examples, network 1200 may include any one or a combination of many different types of networks, such as cable networks, the Internet, wireless networks, cellular networks and other private and/or public networks. The interconnected switches 1204a-1204d and the router 1206, if present, may be referred to as a switch fabric 1210, a fabric, a network fabric, or simply a network. In the context of a computer network, terms "fabric" and "network" may be used interchangeably herein.

The nodes 1202a-1202h may be any combination of host systems, processor nodes, storage subsystems, and I/O chassis that represent user devices, service provider computers or third-party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202a-1202h may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the network(s) 1208 to user devices. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202*a*-1202*h* or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202*a*-1202*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202*a*-1202*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202*a*-1202*h* may also include I/O device(s) 1226, such as a keyboard, a mouse, a pen, a voice input device, a touch input device, a display, speakers, a printer, and the like. The node(s) 1202*a*-1202*h* may also include one or more communication channels 1236. A communication channel 1236 may provide a medium over which the various components of the node(s) 1202*a*-1202*h* can communicate. The communication channel or channels 1236 may take the form of a bus, a ring, a switching fabric, or a network.

The node(s) 1202*a*-1202*h* may also contain network device(s) 1224 that allow the node(s) 1202*a*-1202*h* to communicate with a stored database, another computing device or server, user terminals and/or other devices on the network(s) 1200.

In some implementations, the network device 1224 is a peripheral device, such as a PCI-based device. In these implementations, the network device 1224 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1224 may be connected to a computing system using a PCIe interface.

A PCI-based device may include one or more functions. A "function" describes operations that may be provided by the network device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method performed by a compiler, the computer-implemented method comprising:
    receiving a description of a neural network model;
    generating an intermediate representation of the neural network model representing a data flow graph;
    traversing the data flow graph in reverse order from an output of the data flow graph towards an input of the data flow graph;
    for each tensor in the data flow graph, adding a tensor live interval to a vector of intervals, wherein the tensor live interval indicates a last-use of a corresponding tensor and a first-definition of the corresponding tensor;
    converting the vector of intervals into a binary tree of interval nodes using a median of the vector of intervals as a root of the binary tree of interval nodes;
    for each interval node in the binary tree of interval nodes, determining an earliest-first-definition value for a sub-tree rooted at that interval node, and associating the earliest-first-definition value with that interval node;
    for each tensor in the data flow graph, querying the binary tree of interval nodes for interferences of the tensor to generate an interference list of the tensor;
    performing memory allocation for a buffer memory of an accelerator based on the interference list of the tensor; and
    generating machine code based on the memory allocation, wherein the machine code is executed on the accelerator to implement the neural network model.

2. The computer-implemented method of claim 1, wherein querying the binary tree of interval nodes for interferences of the tensor to generate the interference list of the tensor includes:
    comparing the last-use of the corresponding tensor with the earliest-first-definition value of an interval node in the binary tree of interval nodes; and
    determining that the tensor does not have an interference with any tensor in a sub-tree rooted at the interval node when the last-use of the corresponding tensor is before the earliest-first-definition value of the interval node.

3. The computer-implemented method of claim 1, wherein querying the binary tree of interval nodes for interferences of the tensor to generate the interference list of the tensor includes:
    comparing the last-use of the corresponding tensor with the earliest-first-definition value of an interval node in the binary tree of interval nodes;
    querying a left sub-tree of the interval node when the last-use of the corresponding tensor is after the earliest-first-definition value of the interval node;
    adding the interval node to the interference list of the tensor if the interval node has a live interval that overlaps with the corresponding tensor; and
    comparing the first-definition of the corresponding tensor with a last-use of the interval node.

4. The computer-implemented method of claim 3, wherein querying the binary tree of interval nodes for interferences of the tensor to generate the interference list of the tensor includes:
    querying a right sub-tree of the interval node when the first-definition of the corresponding tensor is before the last-use of the interval node; or
    determining that the tensor does not have an interference with any tensors in a right sub-tree of the interval node when the first-definition of the corresponding tensor is after the last-use of the interval node.

5. A computer-implemented method, comprising:
obtaining a data flow graph representing a computational flow;
for each memory object of a plurality of memory objects in the data flow graph, adding a memory object live interval to a vector of intervals, wherein the memory object live interval indicates a last-use of the memory object and a first-definition of the memory object;
converting the vector of intervals into a binary tree of interval nodes;
for each interval node in the binary tree of interval nodes, determining an earliest-first-definition value for a sub-tree rooted at the interval node, and associating the earliest-first-definition value with the interval node;
querying the binary tree of interval nodes for interferences of a memory object to perform memory allocation for the computational flow;
performing memory allocation for a memory of a computing device based on the interferences of the memory object; and
generating machine code based on the memory allocation, wherein the machine code is executed on the computing device to implement the computational flow.

6. The computer-implemented method of claim 5, wherein the vector of intervals is generated by traversing the data flow graph in reverse order from an output of the data flow graph to an input of the data flow graph.

7. The computer-implemented method of claim 6, wherein a median of the vector of intervals is used as a root of the binary tree of interval nodes.

8. The computer-implemented method of claim 5, wherein querying the binary tree of interval nodes for interferences of the memory object to perform the memory allocation for the computational flow includes:
comparing the last-use of the memory object with the earliest-first-definition value of an interval node in the binary tree of interval nodes.

9. The computer-implemented method of claim 8, wherein querying the binary tree of interval nodes for interferences of the memory object to perform the memory allocation for the computational flow includes:
determining that the memory object does not have an interference with any memory object in a sub-tree rooted at the interval node when the last-use of the memory object is before the earliest-first-definition value of the interval node.

10. The computer-implemented method of claim 8, wherein querying the binary tree of interval nodes for interferences of the memory object to perform the memory allocation for the computational flow includes:
querying a left sub-tree of the interval node when the last-use of the memory object is after the earliest-first-definition value of the interval node.

11. The computer-implemented method of claim 10, wherein querying the binary tree of interval nodes for interferences of the memory object to perform the memory allocation for the computational flow includes:
adding the interval node to an interference list for the memory object if the interval node has a live interval that overlaps with the memory object.

12. The computer-implemented method of claim 10, wherein querying the binary tree of interval nodes for interferences of the memory object to perform the memory allocation for the computational flow includes:
comparing the first-definition of the memory object with a last-use of the interval node.

13. The computer-implemented method of claim 12, wherein querying the binary tree of interval nodes for interferences of the memory object to perform the memory allocation for the computational flow includes:
querying a right sub-tree of the interval node when the first-definition of the memory object is before the last-use of the interval node.

14. The computer-implemented method of claim 12, wherein querying the binary tree of interval nodes for interferences of the memory object to perform the memory allocation for the computational flow includes:
determining that the memory object does not have an interference with any memory object in a right sub-tree of the interval node when the first-definition of the memory object is after the last-use of the interval node.

15. The computer-implemented method of claim 5, further comprising querying the binary tree of interval nodes for interferences of multiple memory objects in parallel.

16. A non-transitory computer-readable storage medium having stored therein instructions that, when executed by one or more processors, cause the one or more processors to execute a compiler, the compiler performing operations including:
obtaining a data flow graph representing a computational flow;
for each memory object of a plurality of memory objects in the data flow graph, adding a memory object live interval to a vector of intervals, wherein the memory object live interval indicates a last-use of the memory object and a first-definition of the memory object;
converting the vector of intervals into a binary tree of interval nodes;
for each interval node in the binary tree of interval nodes, computing an earliest-first-definition value for a sub-tree rooted at the interval node, and associating the earliest-first-definition value with the interval node;
querying the binary tree of interval nodes for interferences of a memory object to perform memory allocation for the computational flow;
performing memory allocation for a memory of a computing device based on the interferences of the memory object; and
generating machine code based on the memory allocation, wherein the machine code is executed on the computing device to implement the computational flow.

17. The non-transitory computer-readable storage medium of claim 16, wherein querying the binary tree of interval nodes for interferences of the memory object to perform the memory allocation for the computational flow includes:
comparing the last-use of the memory object with the earliest-first-definition value of an interval node in the binary tree of interval nodes; and
determining that the memory object does not have an interference with any memory object in a sub-tree rooted at the interval node when the last-use of the memory object is before the earliest-first-definition value of the interval node.

18. The non-transitory computer-readable storage medium of claim 16, wherein querying the binary tree of interval nodes for interferences of the memory object to perform the memory allocation for the computational flow includes:

comparing the last-use of the memory object with the earliest-first-definition value of an interval node in the binary tree of interval nodes;

querying a left sub-tree of the interval node when the last-use of the memory object is after the earliest-first-definition value of the interval node; and adding the interval node to an interference list for the memory object if the interval node has a live interval that overlaps with the memory object.

19. The non-transitory computer-readable storage medium of claim 18, wherein querying the binary tree of interval nodes for interferences of the memory object to perform the memory allocation for the computational flow includes:

comparing the first-definition of the memory object with a last-use of the interval node; and querying a right sub-tree of the interval node when the first-definition of the memory object is before the last-use of the interval node.

20. The non-transitory computer-readable storage medium of claim 18, wherein querying the binary tree of interval nodes for interferences of the memory object to perform the memory allocation for the computational flow includes:

comparing the first-definition of the memory object with a last-use of the interval node; and determining that the memory object does not have an interference with any memory object in a right sub-tree of the interval node when the first-definition of the memory object is after the last-use of the interval node.

\* \* \* \* \*